United States Patent [19]

Nishida et al.

[11] Patent Number: 5,966,447
[45] Date of Patent: Oct. 12, 1999

[54] DATA SCRAMBLING METHOD, DATA SCRAMBLING APPARATUS, DATA DESCRAMBLING METHOD, AND DATA DESCRAMBLING APPARATUS

[75] Inventors: Ikuoh Nishida; Masatoshi Shimbo, both of Osaka-fu, Japan

[73] Assignee: Matsushita Electric Industrial Co., Ltd., Osaka, Japan

[21] Appl. No.: 09/107,326

[22] Filed: Jun. 30, 1998

Related U.S. Application Data

[62] Division of application No. 08/657,281, Jun. 4, 1996, Pat. No. 5,809,146.

[51] Int. Cl.$^6$ ........................................................ H04L 9/00
[52] U.S. Cl. ............................... 380/28; 380/9; 380/49; 380/42
[58] Field of Search ................................. 380/28, 42, 50, 380/9, 49

[56] References Cited

U.S. PATENT DOCUMENTS

| | | |
|---|---|---|
| 3,515,805 | 6/1970 | Fracassi et al. . |
| 3,988,538 | 10/1976 | Patten . |
| 4,965,881 | 10/1990 | Dilley . |
| 5,054,069 | 10/1991 | Maeno et al. . |
| 5,216,714 | 6/1993 | Speiser . |
| 5,231,667 | 7/1993 | Kojima . |
| 5,241,602 | 8/1993 | Lee et al. . |
| 5,608,802 | 3/1997 | Alvarez Alvarez . |

FOREIGN PATENT DOCUMENTS

| | | |
|---|---|---|
| 1298355 | 3/1992 | Canada . |
| 488 325 | 6/1992 | European Pat. Off. . |
| 553 648 | 8/1993 | European Pat. Off. . |
| 56-12120 | 2/1981 | Japan . |
| 63-61280 | 3/1988 | Japan . |
| 6-189262 | 7/1994 | Japan . |

OTHER PUBLICATIONS

Karl Schrodinger, Modulares Optisches Ubertragungssystem fur Datenraten bis 200 MBit/s, Sep. 16, 1988, pp. 63–68, vol. 37, No. 19.

J.C. Newell, High Speed Pseudo–Random Binary Sequence Generation for Testing and Data Scrambling in Gigabit Optical Transmission systems, Apr. 3, 1992, pp. 1/1–1/4 Sections 3,4 and 5.

Kien Du Phung et al.,Study of a SONET STS–3c based ATM User Network Interface Design, Sep. 27, 1993–Oct. 1, 1993, pp. 366–369.

*Primary Examiner*—Gail O. Hayes
*Assistant Examiner*—Ho S. Song
*Attorney, Agent, or Firm*—Wenderoth, Lind & Ponack, L.L.P.

[57] ABSTRACT

A method and apparatus for descrambling data that is characterized by shift registers that realize an operation of generating polynomial and that have a ring-shaped structure that realizes plural and continuous operation. The method and apparatus further includes an initial value setting means for setting initial values in m shift registers; after setting the initial values, shifting the initial values while synchronizing the initial values with input clocks, and outputting the exclusive OR of data which is input while being synchronized with clocks and the lowermost latch outputs. Scrambled data with a byte is treated as a unit by using an exclusive OR circuit block.

1 Claim, 17 Drawing Sheets

$Ds = Di + DsX^{-6} + DsX^{-7}$ $Di = Ds(1 + X^{-6} + X^{-7})$ $Do = Ds(1 + X^{-6} + X^{-7}) = Di$

DATA SCRAMBLING METHOD, DATA SCRAMBLING APPARATUS, DATA DESCRAMBLING METHOD, AND DATA DESCRAMBLING APPARATUS

This is a Rule 1.53(b) Divisional of Ser. No. 08/657,281, filed Jun. 4, 1996, U.S. Pat. No. 5,809,146.

FIELD OF THE INVENTION

The present invention relates to a data scrambling method, a data scrambling apparatus, a data descrambling method, and a data descrambling apparatus which are used when recorded data or communication data are reproduced or received in a record medium or a communication system. More specifically, the invention relates to a data scrambling method and a data scrambling apparatus which are used when data are recorded in a record medium or data are transmitted, and a data descrambling method and a data descrambling apparatus which descramble recorded data or communication data, which have been scrambled by the data scrambling method or the data scrambling apparatus, when the data are reproduced or received.

BACKGROUND OF THE INVENTION

A data scrambling method has conventionally been employed to facilitate detection of timing at a signal change point on a receiver side by averaging changes in amplitude, polarity, and phase of a transmitted signal, even when input data have a periodicity or a constant pattern. In order to realize such a data scrambling method, a data scrambling apparatus has been employed.

Hereinafter, a conventional data scrambling apparatus will be described with reference to figures.

FIGS. 16($a$) and 16($b$) show a conventional data scrambling apparatus and a conventional data descrambling apparatus, respectively. For simplification, a data scrambling apparatus and a data descrambling apparatus, both employing a generating polynomial, $G(X)=1+X^{-6}+X^{-7}$, are taken as examples. In FIG. 16, reference numeral 161 designates a data input terminal, numeral 162 designates a scrambled data output terminal, numeral 163 designates registers, numeral 164 designates a mod 2 adder, numeral 165 designates an initialization table, numeral 166 designates a scrambled data input terminal, and numeral 167 designates a data output terminal.

A description is given of the operation of the data scrambling apparatus shown in FIG. 16($a$). First of all, initialization values are sent to the respective registers 163 from the initialization table 165 to set initial values. Next, serial data Di are input to the data input terminal 161. The input data are shifted, by one bit for each step, to the subsequent register 163. This shifting of data is successively carried out, and scrambled output data Ds are serially output from the data output terminal 162.

A description is now given of the operation of the data descrambling apparatus shown in FIG. 16($b$). First of all, initialization values are set in the respective register 163, and serial data Ds are input to the data input terminal 166. The input data are shifted by one bit for each step, and descrambled output data Do are serially output from the output terminal 167.

Next, a data scrambling apparatus and a data descrambling apparatus which are used in a recording and reproducing apparatus using an optical disk as a medium will be described. In such a recording and reproducing apparatus, generally, scrambling is performed to avoid coincidence of patterns of data recorded in adjacent tracks.

FIGS. 17($a$) and 17($b$) show a conventional data scrambling apparatus and a conventional data descrambling apparatus, respectively, employed in an optical disk recording and reproducing device. For simplification, a scrambling apparatus and a descrambling apparatus employing a generating polynomial, $G(X)=X^7+X^6+1$, are taken as examples.

In these figures, reference numeral 171 designates a data input terminal, numeral 172 designates a scrambled data output terminal, numeral 173 designate registers, numeral 174 designates a mod 2 adder, numeral 175 designates an initialization table, numeral 176 designates a scrambled data input terminal, and numeral 177 designates a data output terminal.

A description is given of the operation of the data scrambling apparatus shown in FIG. 17($a$). First of all, initialization values are sent to the respective registers 173 from the initialization table 175 to set initial values. Next, serial data Di are input to the data input terminal 171. The initialized data in the respective registers 173 are synchronized with the input data Di and shifted, by one bit for each step, to the subsequent register 173. The shifting of the initialized data and the data input are successively carried out, and data obtained by an exclusive- or operation between the input data and the data output from the register in the rightmost stage are output from the data output terminal 172 as scrambled data Ds.

The operation of the data descrambling apparatus shown in FIG. 17($b$) is similar to the operation of the scrambling apparatus shown in FIG. 17($a$). That is, scrambled data Ds are input to the scrambled data input terminal 176, and descrambled data Do are output from the data output terminal 177.

As described above, in the conventional scrambling or descrambling apparatus, data are scrambled or descrambled in binary format. In recent years, however, since data are processed with a byte as a unit, it is necessary to convert binary data to byte data, or vice versa.

SUMMARY OF THE INVENTION

It is an object of the present invention to provide a data scrambling apparatus and a data descrambling apparatus that can scramble and descramble input data with no need of converting binary data to byte data or vice versa.

It is another object of the present invention to provide a data scrambling method and a data descrambling method that can scramble and descramble input data with no need of converting binary data to byte data or vice versa.

Other objects and advantages of the invention will become apparent from the detailed description that follows. The detailed and specific embodiments described are provided only for illustration since various additions and modifications within the spirit and scope of the invention will be apparent to those of skill in the art from the detailed description.

According to a first aspect of the present invention, a data scrambling method, defined by data polynomial, $$D(X)=d_n X^n + d_{n-1} X^{n-1} + d_{n-2} X^{n-2} + \ldots + d_2 X^2 + d_1 X^1 + d_0 X^0$$

generating polynomial, $$G(X)=1+g_{-1}X^{-1}+g_{-2}X^{-2}+ \ldots +g_{-m+2}X^{-m+2}+g_{-m+1}X^{-m+1}+g_{-m}X^{-m}$$

and, residual polynomial, $$R(X)=R_{-1}X^{-1}+R_{-2}X^{-2}+R_{-3}X^{-3}+\ldots+R_{-m+2}X^{-m+2}+R_{-m+1}X^{-m+1}+R_{-m}X^{-m}$$

is characterized by:

setting initial values $R_{-m+k}(0)=N_{-m+k}$ of the respective coefficients $R_{-m+k}$ (k=0, 1, ..., m−1) in the residual polynomial (here, $R_{-m+k(i)}$ is a value obtained, when the coefficient $R_{-m+k}$ in the residual polynomial is a value of a latch, by shifting the latch by i times) to 0 or 1, using an initial value setting means;

in order to treat information data with a byte as a unit, dividing first input data dn ~dn-7 corresponding to 8 bits from the uppermost bit in the data polynomial, with the generating polynomial, to obtain the coefficients in the residual polynomial, $$R_{-m+k}(i)=R_{-m+k+1}(i-1)(k=0, 1, \ldots, m-1, i=0, 1, \ldots 8, \text{excluding } k=m-1, i=8)$$

$$R_{-1}(8)=g_{-1}R_{-1}(7)+g_{-2}R_{-2}(7)+\ldots+g_{-m+1}R_{-m+1}(7)+g_{-m}R_{-m}(7)+d_{n-7}$$

regarding residual results of the division as next initial values, performing exclusive OR operation between these initial values and next input data dn-8~dn-15;

repeating these operations by times as many as the number of byte in the input binary data; and outputting ds(1)~ds(8), in a lump, as ds7~ds0, said ds(1)~ds(8) being successively obtained when the result of the exclusive OR operation for each unit of the repetition is represented, with a byte as a unit, by the following relationship, $$ds(i) = \sum_{k=1}^{m} \{g_{-k}R_{-k}(i-1)\} + d_{n-i+1} \ (i = 1, 2, \ldots, 8)$$

whereby data input in binary format are scrambled in byte format.

According to a second aspect of the present invention, a data descrambling method, defined by data polynomial, $$D(X)=d_nX^n+d_{n-1}X^{n-1}+d_{n-2}X^{n-2}+\ldots+d_2X^2+d_1X^1+d_0X^0$$

generating polynomial, $$G(X)=1+g_{-1}X^{-1}+g_{-2}X^{-2}+\ldots+g_{-m+2}X^{-m+2}+g_{-m+1}X^{-m+1}+g_{-m}X^{-m}$$

and, residual polynomial, $$R(X)=R_{-1}X^{-1}+R_{-2}X^{31\ 2}+R_{-3}X^{-3}+\ldots+R_{-m+2}X^{-m+2}+R_{-m+1}X^{-m+1}+R_{-m}X^{-m}$$

is characterized by:

setting initial values $R_{-m+k}(0)=N_{-m+k}$ of the respective coefficients $R_{-m+k}$ (k=0, 1, ..., m−1) in the residual polynomial (here, $R_{-m+k(i)}$ is a value obtained, when the coefficient $R_{-m+k}$ in the residual polynomial is a value of a latch, by shifting the latch by i times) to 0 or 1, using an initial value setting means;

in order to treat information data with a byte as a unit, multiplying dn~dn-7 corresponding to 8 bits from the uppermost bit in the data polynomial, by the generating polynomial, wherein coefficients of latches of shift registers constituted to realize the multiplication are given by $$R_{-m+k}(i)=R_{-m+k+1}(i-1)(k=0, 1, \ldots, m-1, i=0, 1, \ldots, 8, \text{excluding } k=m-1, i=8)$$

$$R_{-1}(8)=d_{n-7}$$

regarding residual data left in the respective latches of the shift registers after the multiplication, as next initial values, and performing exclusive OR operation between these initial values and next input data dn-8~dn-15;

repeating the exclusive OR operation by times as many as the number of bytes in the input binary data; and outputting do(1)~do(8), in a lump, as do7~do0, said do(1)~do(8) being successively obtained when the result of the exclusive OR operation for each unit of the repetition is represented, with a byte as a unit, by the following relationship, $$do(i) = \sum_{k=1}^{m} \{g_{-k}R_{-k}(i-1)\} + d_{n-i+1} \ (i = 1, 2, \ldots, 8)$$

whereby data scrambled in binary format are descrambled in byte format.

According to a third aspect of the present invention, a data descrambling method, defined by data polynomial, $$D(X)=d_0X^0+d_1X^1+d_2X^2+\ldots+d_{n-2}X^{n-2}+d_{n-1}X^{n-1}+d_nX^n$$

generating polynomial, $$G(X)=1+g_{-1}X^{-1}+g_{-2}X^{-2}+\ldots+g_{-m+2}X^{-m+2}+g_{-m+1}X^{-m+1}+g_{-m}X^{-m}$$

and, residual polynomial, $$R(X)=R_{-1}X^{-1}+R_{-2}X^{-2}+R_{-3}X^{-3}+\ldots+R_{-m+2}X^{-m+2}+R_{-m+1}X^{-m+1}+R_{-m}X^{-m}$$

is characterized by:

setting initial values $R_{-m+k}(0)=N_{-m+k}$ of the respective coefficients $R_{-m+k}$ (k=0, 1, ..., m−1) in the residual polynomial (here, $R_{-m+k(i)}$ is a value obtained, when the coefficient $R_{-m+k}$ in the residual polynomial is a value of a latch, by shifting the latch by i times) to 0 or 1, using an initial value setting means;

in order to treat information data with a byte as a unit, providing an exclusive OR circuit block comprising 8-bit parallel latches in {In|(m+7)/8|+1} stages (In|formula| is a value of an integral part of a value obtained by the formula), said exclusive OR circuit block performing an exclusive OR operation such that values of the 8-bit latches and outputs from output terminals have a relationship, $$doi = Ri + \sum_{k=1}^{m} \{g_{-k}R_{-(k-i)}\} \ (i = 0, 1, \ldots, 7)$$

and outputting outputs do0~do7, whereby data scrambled in binary format are input in byte format, by 8 bits in parallel, and descrambled data are output in byte format, by 8 bits in parallel.

According to a fourth aspect of the present invention, a data scrambling apparatus performing a data scrambling method defined by data polynomial, $$D(X)=d_nX^n+d_{n-1}X^{n-1}+d_{n-2}X^{n-2}+\ldots+d_2X^2+d_1X^1+d_0X^0$$

generating polynomial, $$G(X)=1+g_{-1}X^{-1}+g_{-2}X^{-2}+\ldots+g_{-m+2}X^{-m+2}+g_{-m+1}X^{-m+1}+g_{-m}X^{-m}$$

and, residual polynomial, $$R(X)=R_{-1}X^{-1}+R_{-2}X^{-2}+R_{-3}X^{-3}+\ldots+R_{-m+2}X^{-m+2}+R_{-m+1}X^{-m+1}+R_{-m}X^{-m}$$

is characterized by:

setting initial values $R_{-m+k}(0)=N_{-m+k}$ of the respective coefficients $R_{-m+k}$ (k=0, 1, . . . , m−1) in the residual polynomial (here, $R_{-m+k(i)}$ is a value obtained, when the coefficient $R_{-m+k}$ in the residual polynomial is a value of a latch, by shifting the latch by i times) to 0 or 1, using an initial value setting means;

in order to treat information data with a byte as a unit, dividing first input data dn~dn-7 corresponding to 8 bits from the uppermost bit in the data polynomial, with the generating polynomial, to obtain the coefficients in the residual polynomial, $$R_{-m+k}(i)=R_{-m+k+1}(i-1)(k=0, 1, \ldots, m-1, i=0, 1, \ldots 8, \text{excluding } k=m-1, i=8)$$

$$R_{-1}(8)=g_{-1}R_{-1}(7)+g_{-2}R_{-2}(7)+\ldots+g_{-m+1}R_{-m+1}(7)+g_{-m}R_{-m}(7)+d_{n-7}$$

performing exclusive OR operation between the initial values $N_{-m+k}$ and values obtained by multiplying the initial values $N_{-m+k}$ by coefficients of the respective latches which are shifted by 8 times;

regarding residual results of the exclusive OR operation as next initial values, performing exclusive OR operation between these initial values and next input data dn-8~dn-15;

repeating the latter exclusive OR operation by times as many as the number of bytes in input binary data; and outputting ds(1)~ds(8), in a lump, as ds7~ds0, said ds(1)~ds(8) being successively obtained when the result of the exclusive OR operation for each unit of the repetition is represented, with a byte as a unit, by the following relationship, $$ds(i) = \sum_{k=1}^{m} \{g_{-k}R_{-k}(i-1)\} + d_{n-i+1} \ (i=1, 2, \ldots, 8)$$

whereby data input in binary format are scrambled in byte format, by 8 bits in parallel, and scrambled data are output in byte format, by 8 bits in parallel.

According to a fifth aspect of the present invention, a data descrambling apparatus performing a data descrambling method defined by data polynomial, $$D(X)=d_0X^0+d_1X^1+d_2X^2+\ldots+d_{n-2}X^{n-2}+d_{n-1}X^{n-1}+d_nX^n$$

generating polynomial, $$G(X)=1+g_{-1}X^{-1}+g_{-2}X^{-2}+\ldots+g_{-m+2}X^{-m+2}+g_{-m+1}X^{-m+1}+g_{-m}X^{-m}$$

and, residual polynomial, $$R(X)=R_{-1}X^{-1}+R_{-2}X^{-2}+R_{-3}X^{-3}+\ldots+R_{-m+2}X^{-m+2}+R_{-m+1}X^{-m+1}+R_{-m}X^{-m}$$

is characterized by:

initial value setting means for setting initial values $R_{-m+k}(0)=N_{-m+k}$ of the respective coefficients $R_{-m+k}$ (k=0, 1, . . . , m−1) in the residual polynomial (here, $R_{-m+k(i)}$ is a value obtained, when the coefficient $R_{-m+k}$ in the residual polynomial is a value of a latch, by shifting the latch by i times) to 0 or 1; and in order to treat information data with a byte as a unit, an exclusive OR circuit block comprising 8-bit parallel latches in {In|(m+7)/8|+1} stages (In|formula| is a value of an integral part of a value obtained by the formula), said exclusive OR circuit block performing an exclusive OR operation such that values of the 8-bit latches and outputs from output terminals have a relationship, $$doi = Ri + \sum_{k=1}^{m} \{g_{-k}R_{-(k-i)}\} \ (i=0, 1, \ldots, 7)$$

and outputting do0~do7, whereby data scrambled in binary format are input in byte format, by 8 bits in parallel, and descrambled data are output in byte format, by 8 bits in parallel.

According to a sixth aspect of the present invention, a data descrambling apparatus performing a data descrambling method defined by data polynomial, $$D(X)=d_nX^n+d_{n-1}X^{n-1}+d_{n-2}X^{n-2}+\ldots+d_2X^2+d_1X^1+d_0X^0$$

generating polynomial, $$G(X)=1+g_{-1}X^{-1}+g_{-2}X^{-2}+\ldots+g_{-m+2}X^{-m+2}+g_{-m+1}X^{-m+1}+g_{-m}X^{-m}$$

and, residual polynomial, $$R(X)=R_{-1}X^{-1}+R_{-2}X^{-2}+R_{-3}X^{-3}+\ldots+R_{-m+2}X^{-m+2}+R_{-m+1}X^{-m+1}+R_{-m}X^{-m}$$

is characterized by:

including a binary format serial data input terminal;

setting initial values $R_{-m+k}(0)=N_{-m+k}$ of the respective coefficients $R_{-m+k}$ (k=0, 1, . . . , m−1) in the residual polynomial (here, $R_{-m+k(i)}$ is a value obtained, when the coefficient $R_{-m+k}$ in the residual polynomial is a value of a latch, by shifting the latch by i times) to 0 or 1, using an initial value setting means;

in order to treat information data with a byte as a unit, multiplying dn~dn-7 corresponding to 8 bits from the uppermost bit in the data polynomial, by the generating polynomial, wherein coefficients of latches of shift registers constituted to realize the multiplication are given by $$R_{-m+k}(i)=R_{-m+k+1}(i-1)(k=0, 1, \ldots m-1, i=0, 1, \ldots 8, \text{excluding } k=m-1, i=8)$$

$$ds(8)=g_{-1}R_{-1}(7)+g_{-2}R_{-2}(7)+\ldots+g_{-m+1}R_{-m+1}(7)+g_{-m}R_{-m}(7)+d_{n-7}$$

regarding residual data left in the respective latches of the shift registers after the multiplication, as next initial values, and performing exclusive OR operation between these initial values and next input data dn-8~dn-15;

repeating the exclusive OR operation by times as many as the number of bytes in the input binary data; and outputting do(1)~do(8), in a lump, as do7~do0, said do(1)~do(8) being successively obtained when the result of the exclusive OR operation for each unit of the repetition is represented, with a byte as a unit, by the following relationship, $$do(i) = \sum_{k=1}^{m} \{g_{-k}R_{-k}(i-1)\} + d_{n-i+1} \ (i=1, 2, \ldots, 8)$$

whereby data scrambled in binary format are serially input in binary format, and descrambled data are output in byte format, by 8 bits in parallel.

According to a seventh aspect of the present invention, a data scrambling apparatus performing a data scrambling method defined by data polynomial, $$D(X)=d_nX^n+d_{n-1}X^{n-1}+d_{n-2}X^{n-2}+\ldots+d_2X^2+d_1X^1+d_0X^0$$

generating polynomial, $$G(X)=1+g_{-1}X^{-1}+g_{-2}X^{-2}+\ldots+g_{-m+2}X^{-m+2}+g_{-m+1}X^{-m+1}+g_{-m}X^{-m}$$

and, residual polynomial:

$$R(X)=R_{-1}X^{-1}+R_{-2}X^{-2}+R_{-3}X^{-3}+\ldots+R_{-m+2}X^{-m+2}+R_{-m+1}X^{-m+1}+R_{-m}X^{-m}$$

is characterized by:
  including a binary format serial data input terminal;
  setting initial values $R_{-m+k}(0)=N_{-m+k}$ of the respective coefficients $R_{-m+k}$ (k=0, 1, ..., m−1) in the residual polynomial (here, $R_{-m+k(i)}$ is a value obtained, when the coefficient $R_{-m+k}$ in the residual polynomial is a value of a latch, by shifting the latch by i times) to 0 or 1, using an initial value setting means;
  in order to treat information data with a byte as a unit, dividing dn~dn-7 corresponding to 8 bits from the uppermost bit in the data polynomial, with the generating polynomial, to obtain the coefficients in the residual polynomial, $$R_{-m+k}(i)=R_{-m+k+1}(i-1)(k=0, 1, \ldots m-2)$$
$$R_{-1}(8)=g_{-1}R_{-1}(7)+g_{-2}R_{-2}(7)+\ldots+g_{-m+1}R_{-m+1}(7)+g_{-m}R_{-m}(7)+d_{n-7}$$

regarding residual results of the division as next initial values, performing exclusive OR operation between these initial values and next input data dn-8~dn-15;
  repeating the exclusive OR operation by times as many as the number of bytes in the input binary data; and
  outputting ds(1)~ds(8), as ds7~ds0, in byte format, i.e., by 8 bits in parallel, said ds(1)~ds(8) being successively obtained when the result of the exclusive OR operation for each unit of the repetition is represented, with a byte as a unit, by the following relationship:

$$ds(i)=\sum_{k=1}^{m}\{g_{-k}R_{-k}(i-1)\}+d_{n-i+1} \ (i=1, 2, \ldots, 8)$$

whereby data are serially input in binary format, and scrambled data are output in byte format, i.e., by 8 bits in parallel.

According to an eighth aspect of the present invention, a data descrambling apparatus performing a data descrambling method defined by data polynomial, $$D(X)=d_0X^0+d_1X^1+d_2X^2+\ldots+d_{n-2}X^{n-2}+d_nX^n+d_nX^n$$

generating polynomial, $$G(X)=1+g_{-1}X^{-1}+g_{-2}X^{-2}+\ldots+g_{-m+2}X^{-m+2}+g_{-m+1}X^{-m+1}+g_{-m}X^{-m}$$

and, residual polynomial, $$R(X)=R_{-1}X^{-1}+R_{-2}X^{-2}+R_{-3}X^{-3}+\ldots+R_{-m+2}X^{-m+2}+R_{-m+1}X^{-m+1}+R_{-m}X^{-m}$$

wherein n is integer multiple of 8, and n>m, is characterized by:
  initial value setting means for setting initial values $R_{-m+k}(0)=N_{-m+k}$ of the respective coefficients $R_{-m+k}$ (k=0, 1, ..., m−1) in the residual polynomial (here, $R_{-m+k(i)}$ is a value obtained, when the coefficient $R_{-m+k}$ in the residual polynomial is a value of a latch, by shifting the latch by i times) to 0 or 1;
  in order to treat information data with a byte as a unit, an exclusive OR circuit block comprising 8-bit parallel latches in $\{In|(m+7)/8|+1\}$ stages (In|formula| is a value of an integral part of a value obtained by the formula), said exclusive OR circuit block performing an exclusive OR operation such that values of the 8-bit latches and outputs from output terminals have a relationship, $$doi=Ri+\sum_{k=1}^{m}\{g_{-k}R_{-(k-i)}\} \ (i=0, 1, \ldots, 7)$$

and outputting do0~do7;
  8-bit parallel to serial converting means for converting parallel data descrambled by the exclusive OR circuit block to serial data; and
  an output terminal for outputting binary data converted to serial bits by the parallel to serial converting means, whereby data scrambled in binary format are input in byte format, by 8 bits in parallel, descrambled in byte format, by 8 bits in parallel, and output serially in binary format.

According to a ninth aspect of the present invention, a data scrambling method is characterized by:
  shift registers Rm-j ($1\leq j\leq m$) in m stages that realize an operation of a generating polynomial, $$G(X)=X^m+g_{m-1}X^{m-1}+g_{m-2}X^{m-2}+g_{m-3}X^{m-3}+\ldots+g_3X^3+g_2X^2+g_1X^1+1$$

and that have a ring-shaped structure that realizes plural and continuous operation;
  initial value setting means for setting initial values in the m shift registers;
  after setting the initial values, shifting the initial values while synchronizing the initial values with input clocks, and outputting exclusive OR between data which are input while being synchronized with clocks and the lowermost latch outputs; and
  in order to treat information data with a byte as a unit, making the following relationship between 8-bit input means di0~di7, 8-bit output means ds0~ds7, input values, values of the respective latches, and output values, $$ds \ k=R_0(7)+di \ k \ k=0, 1, 2, \ldots, 7$$

shifting data in the shift registers by 8 times at each output of one byte data, and repeating the shifting, whereby data scrambling is performed with a byte as a unit.

According to a tenth aspect of the present invention, a data descrambling method is characterized by:
  shift registers Rm-j ($1\leq j\leq m$) in m stages that realize an operation of a generating polynomial, $$G(X)=X^m+g_{m-1}X^{m-1}+g_{m-2}X^{m-2}+g_{m-3}X^{m-3}+\ldots+g_3X^3+g_2X^2+g_1X^1+1$$

and that have a ring-shaped structure that realizes plural and continuous operation;
  initial value setting means for setting initial values in the m shift registers;
  after setting the initial values, shifting the initial values while synchronizing the initial values with input clocks, and outputting exclusive OR between data which are input while being synchronized with clocks and the lowermost latch outputs;

in order to treat scrambled data with a byte as a unit, making the following relationship between 8-bit input means ds0~di7, 8-bit output means ds0~ds7, inputs, values of the respective latches, and outputs, $$d_0k = R_0(k) + ds\ k\ k = 0,1,2,\ldots,7$$

shifting data in the shift registers by 8 times at each output of one byte data, and repeating the shifting, whereby data descrambling is performed with a byte as a unit.

According to an eleventh aspect of the present invention, a data scrambling apparatus is characterized by:

shift registers Rm-j ($1 \leq j \leq m$) in m stages that realize an operation of a generating polynomial, $$G(X) = X^m + g_{m-1}X^{m-1} + g_{m-2}X^{m-2} + g_{m-3}X^{m-3} + \ldots + g_3X^3 + g_2X^2 + g_1X^1 + 1$$

and that have a ring-shaped structure that realizes plural and continuous operation;

initial value setting means for setting initial values in the m shift registers;

after setting the initial values, shifting the initial values while synchronizing the initial values with input clocks, and outputting exclusive OR between data which are input while being synchronized with clocks and the lowermost latch outputs;

in order to treat information data with a byte as a unit, an exclusive OR circuit block providing the following relationship between 8-bit input means di0~di7, 8-bit output means ds0~ds7, input values, values of the respective latches, and output values, $$ds\ k = R_0(k) + di\ k\ k = 0,1,2,\ldots,7$$

shifting data in the shift registers by 8 times at each output of one byte data, and repeating the shifting, whereby data to be scrambled are input, by a byte of 8 bits as a unit, in parallel, and data scrambled in binary format are output by 8 bits in parallel.

According to a twelfth aspect of the present invention, a data descrambling apparatus is characterized by:

shift registers Rm-j ($1 \leq j \leq m$) in m stages that realize an operation of a generating polynomial, $$G(X) = X^m + g_{m-1}X^{m-1} + g_{m-2}X^{m-2} + g_{m-3}X^{m-3} + \ldots + g_3X^3 g_2X^2 + g_1X^1 + 1$$

and that have a ring-shaped structure that realizes plural and continuous operation; and initial value setting means for setting initial values in the m shift registers;

after setting the initial values, shifting the initial values while synchronizing the initial values with input clocks, and outputting exclusive OR between data which are input while being synchronized with clocks and the lowermost latch outputs;

in order to treat scrambled data with a byte as a unit, an exclusive OR circuit block providing the following relationship between 8-bit input means ds0~di7, 8-bit output means ds0~ds7, inputs, values of the respective latches, and outputs, $$d_0k = R_0(k) + ds\ k\ k = 0,1,2,\ldots,7$$

shifting data in the shift registers by 8 times at each output of one byte data, and repeating the shifting, whereby data scrambled in binary format are input, by a byte of 8 bits as a unit, in parallel, and descrambled data are output by 8 bits in parallel.

DETAILED DESCRIPTION OF THE PREFERRED EMBODIMENTS

Embodiment 1

Figure 1:
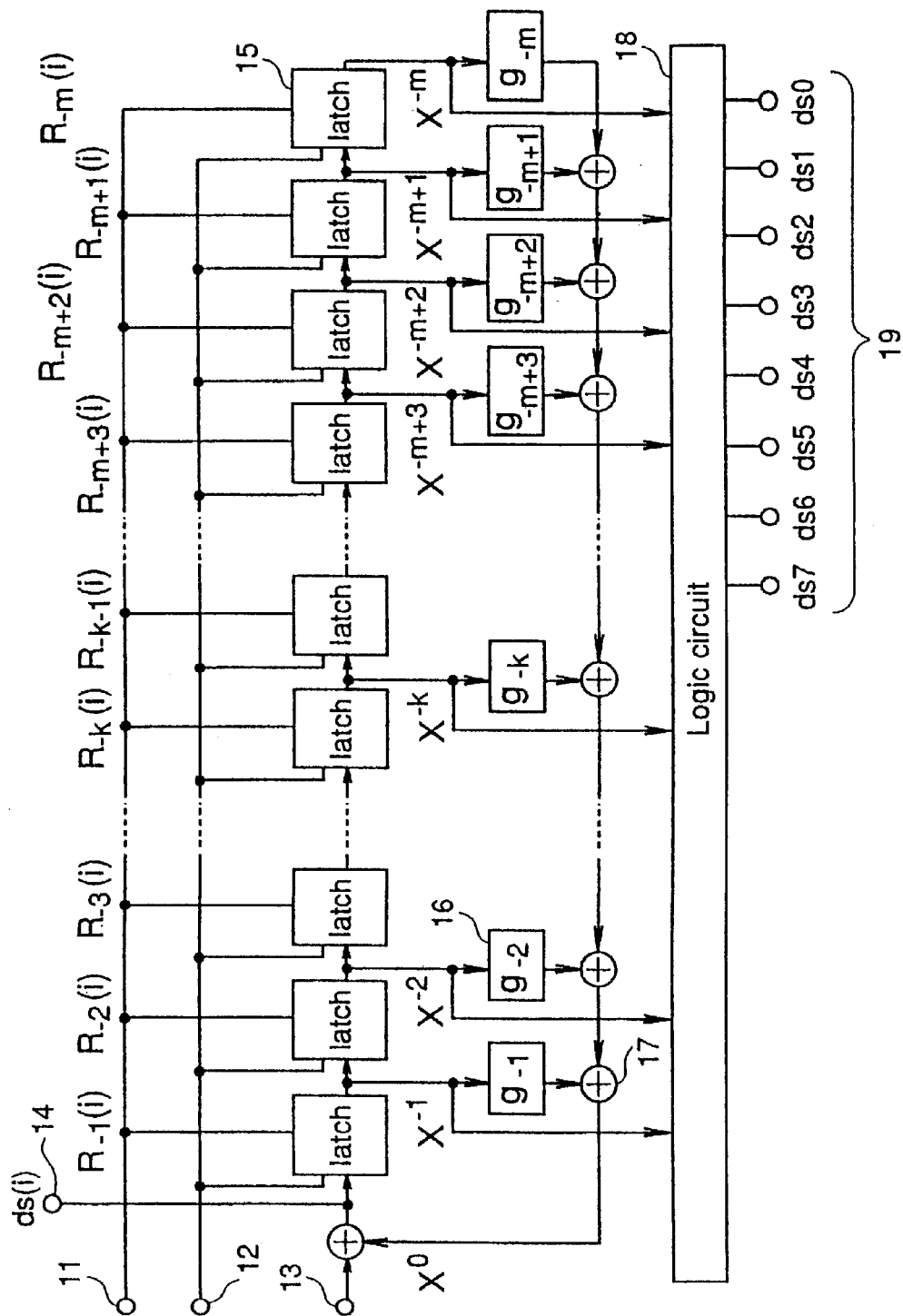
FIG. 1 is a diagram for explaining a principle of a data scrambling method according to a first embodiment of the present invention.

FIG. 1 is a circuit diagram for explaining a data scrambling method in which information data input in binary format are scrambled in byte format, according to a first embodiment of the invention. Table 1 shows the operating state of the circuit shown in FIG. 1. Table 2 shows the operating state of the circuit in a case where a generating polynomial in table 1 is specified. In FIG. 1, reference numeral 11 designates an initial value setting terminal, numeral 12 designates a clock input terminal, numeral 13 designates a data input terminal, numeral 14 designates a serial data output terminal, numeral 15 designates registers, numeral 16 designates coefficient multipliers, numeral 17 designates mod 2 adders, numeral 18 designates a logic circuit block, and numeral 19 designates parallel output terminals.

First of all, a scrambling method when data are recorded in a record medium or data are transmitted in a communication system will be explained and, thereafter, a principle of converting a scrambling method for binary data to a scrambling method for byte data will be explained. In advance of the explanation, respective data are defined as follows.

Data Polynomial $$D(X) = dnX^n + dn\text{-}1X^{n-1} + dn\text{-}2X^{n-2} + \ldots + d2X^2 + d1X + d0$$

Generating Polynomial $$G(X) = 1 + g\text{-}1X^{-1} + g\text{-}2X^{-2} + \ldots + g\text{-}m+2X^{-m+2} + g\text{-}m+1X^{-m+1} + g\text{-}mX^{-m}$$

where di and gi are 0 or 1.

In advance of input of binary data, the respective registers 15 are set at initial values, 0 or 1, by the initial value setting terminal 11. Next, information data, i.e., binary data, are serially input to the data input terminal 13, and the data are shifted, by times as many as the bit number, in response to clocks synchronized with data (signals) input to the clock input terminal 12. Meanwhile, the information data are scrambled and output, in parallel, from the output terminals 19 to be recorded or transmitted.

In this first embodiment of the invention, in order to treat information data with a byte as a unit, initially, 8 bits of binary data are input. More specifically, in FIG. 1, 8 bits from the uppermost bit in the data polynomial, i.e., dn~dn-7, are serially input to the data input terminal 13 and shifted by 8 times, and a result of this 8-times shifting is obtained. For this purpose, the respective latch outputs at each shifting are defined as, from the upper side, R-m(i)~R-1(i), as shown in table 1. Further, in advance of the operation, initial values, 0 or 1, are preset in the respective registers 15 by the initial value setting terminal 11, and the initial values are, from the upper side, N-m~N-1. Furthermore, in FIG. 1, the output from the serial output terminal 14 is denoted by ds(i) where i is the number of times of shifting. Table 1 shows the outputs from the respective registers at each shifting. The result of the 8-times shifting is obtained by substituting the result of the shifting at each time for each latch output at the 8th shifting in table 1. The data output from the respective registers 15 are transmitted through the logic circuit block 18 providing the following relationships between the input and the output and, consequently, data ds7~ds0 are output, in byte format, i.e., by 8 bits, from the parallel output terminals 19. These output data are scrambled.

$ds7 = g\text{-}1R\text{-}1(0) + g\text{-}2R\text{-}2(0) + g\text{-}3R\text{-}3(0) + \ldots + g\text{-}m+2R\text{-}m+2(0) + g\text{-}m+1R\text{-}m+1(0) + g\text{-}mR\text{-}m(0) + dn$ $ds6 = g\text{-}1R\text{-}1(1) + g\text{-}2R\text{-}2(1) + g\text{-}3R\text{-}3(1) + \ldots + g\text{-}m+2R\text{-}m+2(1) + g\text{-}m+1R\text{-}m+1(1) + g\text{-}mR\text{-}m(1) + dn\text{-}1$ $ds5 = g\text{-}1R\text{-}1(2) + g\text{-}2R\text{-}2(2) + g\text{-}3R\text{-}3(2) + \ldots + g\text{-}m+2R\text{-}m+2(2) + g\text{-}m+1R\text{-}m+1(2) + g\text{-}mR\text{-}m(2) + dn\text{-}2$ $ds4 = g\text{-}1R\text{-}1(3) + g\text{-}2R\text{-}2(3) + g\text{-}3R\text{-}3(3) + \ldots + g\text{-}m+2R\text{-}m+2(3) + g\text{-}m+1R\text{-}m+1(3) + g\text{-}mR\text{-}m(3) + dn\text{-}3$ $ds3 = g\text{-}1R\text{-}1(4) + g\text{-}2R\text{-}2(4) + g\text{-}3R\text{-}3(4) + \ldots + g\text{-}m\text{-}2R\text{-}m+2(4) + g\text{-}m+1R\text{-}m+1(4) + g\text{-}mR\text{-}m(4) + dn\text{-}4$ $ds2 = g\text{-}1R\text{-}1(5) + g\text{-}2R\text{-}2(5) + g\text{-}3R\text{-}3(5) + \ldots + g\text{-}m+2R\text{-}m+2(5) + g\text{-}m+1R\text{-}m+1(5) + g\text{-}mR\text{-}m(5) + dn\text{-}5$ $ds1 = g\text{-}1R\text{-}1(6) + g\text{-}2R\text{-}2(6) + g\text{-}3R\text{-}3(6) + \ldots + g\text{-}m+2R\text{-}m+2(6) + g\text{-}m+1R\text{-}m+1(6) + g\text{-}mR\text{-}m(6) + dn\text{-}6$ $ds0 = g\text{-}1R\text{-}1(7) + g\text{-}2R\text{-}2(7) + g\text{-}3R\text{-}3(7) + \ldots + g\text{-}m+2R\text{-}m+2(7) + g\text{-}m+1R\text{-}m+1(7) + g\text{-}mR\text{-}m(7) + dn\text{-}7$ Thereafter, when the next one byte of data are input as information data, the above-described R-m(8)~R-1(8) are used as the next initial values N-m~N-1, and the same operation as described above is performed. When the input data are L byte, the operation is repeated by L times.

In order to facilitate and embody the explanation, the generating polynomial is simplified to $G(X) = 1 + X^{-6} + X^{-7}$, and the data polynomial is simplified to one byte, i.e., $D(X) = d7X^7 + d6X^6 + d5X^5 + d4X^4 + d3X^3 + d2X^2 + d1X + d0$, and outputs from the respective registers are obtained as shown in table 2. From table 2, the outputs from the respective registers are obtained as follows:

$$\begin{aligned} R-7(8) &= R-6(7) \\ &= R-5(6) \\ &= R-4(5) \\ &= R-3(4) \\ &= R-2(3) \\ &= R-1(2) \\ &= R-7(1) + R-6(1) + d6 \\ &= N-6 + N-5 + d6 \end{aligned}$$

$R-6(8) = N-5 + N-4 + d5$ $R-5(8) = N-4 + N-3 + d4$ $R-4(8) = N-3 + N-2 + d3$ $R-3(8) = N-2 + N-1 + d2$ $R-2(8) = N-7 + N-6 + N-1 + d1 + d7$ $R-1(8) = N-7 + N-5 + d0 + d6 + d7$

From the respective registers, through the logic circuit block having the following relationships between the input and the output, scrambled data ds7~ds0 are output in byte format.

$ds7 = R\text{-}6(0) + R\text{-}7(0) + d7$ $ds6 = R\text{-}6(1) + R\text{-}7(1) + d6$ $ds5 = R\text{-}6(2) + R\text{-}7(2) + d5$ $ds4 = R\text{-}6(3) + R\text{-}7(3) + d4$ $ds3 = R\text{-}6(4) + R\text{-}7(4) + d3$ $ds2 = R\text{-}6(5) + R\text{-}7(5) + d2$ $ds1=R\text{-}6(6)+R\text{-}7(6)+d1$ $ds0=R\text{-}6(7)+R\text{-}7(7)+d0$ When the next one byte of data are input as information data, the above-described R-7(8)~R-1(8) are used as the next initial values N-7~N-1, and the same operation as described above is performed. When the input data are L byte, the operation is repeated by L times.

According to the first embodiment of the present invention, since the data scrambling method employs the logic circuit block 18 that operates each of serial outputs for 8-times shifting obtained in the conventional scrambling method, input data are scrambled with 8 bits as a unit, and data in byte format are obtained as scrambled output data. Therefore, the troubles in converting scrambled data in binary format to byte data by serial to parallel conversion as in the conventional method are eliminated.

Further, the shift registers 15 are disposed on the input side while the logic circuit 18 is disposed on the output side, and data input and data output are performed with the same clock. Therefore, a data scrambling apparatus is easily constituted as a synchronous circuit.

While data are scrambled with a byte (8 bits) as a unit in this first embodiment of the invention, it is possible to scramble arbitrary bits, in a lump, using a similar scrambling method.

Embodiment 2

Figure 2:
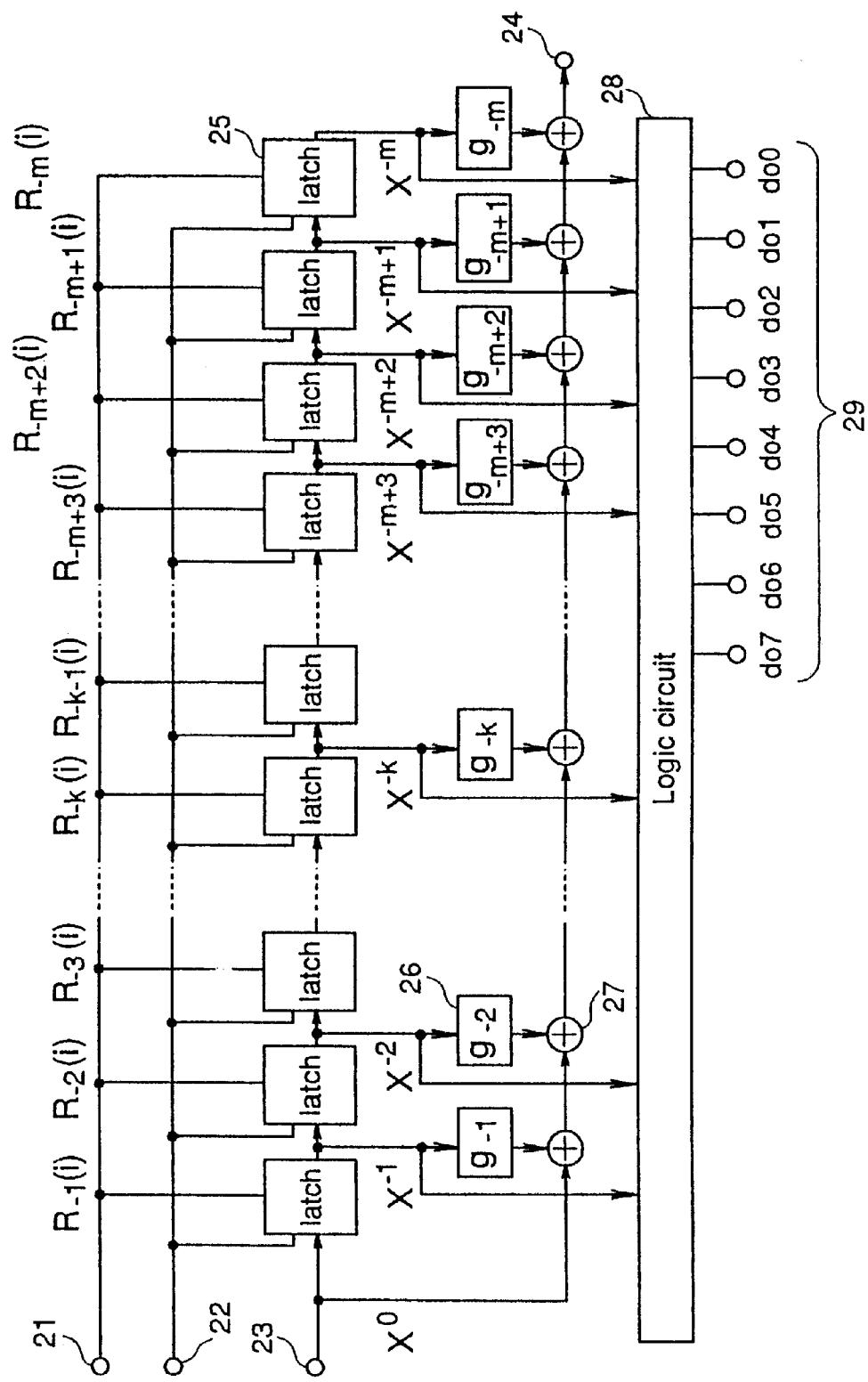
FIG. 2 is a diagram for explaining a principle of a data descrambling method according to a second embodiment of the present invention.

FIG. 2 is a circuit diagram for explaining a data descrambling method in which input data scrambled in binary format are descrambled in byte format, according to a second embodiment of the present invention. Table 3 shows the operating state of the circuit shown in FIG. 2, and table 4 shows the operating state in a case where a generating polynomial in table 3 is specified. In FIG. 2, reference numeral 21 designates an initial value setting terminal, numeral 22 designates a clock input terminal, numeral 23 designates a data input terminal, numeral 24 designates a serial data output terminal, numeral 25 designates registers, numeral 26 designates coefficient multipliers, numeral 27 designates mod 2 adders, numeral 28 designates a logic circuit block, and numeral 29 designates parallel output terminals.

First of all, a descrambling method when data are reproduced from a record medium or data are received in a communication system will be explained and, thereafter, a principle for converting a descrambling method for binary data to a descrambling method for byte data will be explained. In advance of the explanation, respective data are defined as follows.

Data Polynomial $D(X)=dnX^n+dn\text{-}1X^{n-1}+dn\text{-}2X^{n-2}+\ldots+d2X^2+d1X+d0$ Generating Polynomial $G(X)=1+g\text{-}1X^{-1}+g\text{-}2X^{-2}+\ldots+g\text{-}m+2X^{-m+2}+g\text{-}m+1X^{-m+1}+g\text{-}mX^{-m}$ In advance of input of scrambled binary data, the respective registers 25 are set at initial values, 0 or 1, by the initial value setting terminal 21. Next, information data, i.e., binary data, are serially input to the data input terminal 23, and these data are shifted, by times as many as the bit number of the information data, in response to clocks synchronized with data (signals) input to the clock input terminal 22. Meanwhile, the information data are descrambled and output, in parallel, from the output terminals 29.

In this second embodiment of the invention, in order to treat information data with a byte as a unit, initially, 8 bits of binary data are input. More specifically, in FIG. 2, 8 bits from the uppermost bit in the data polynomial, i.e., dn~dn-7, are successively input to the input terminal 23 and shifted by 8 times, and a result of this 8-times shifting is obtained. For this purpose, the outputs from the respective registers 25 at each shifting are defined, from the upper side, R-m(i)~R-1(i), as shown in table 3. Further, in advance of the operation, initial values, 0 or 1, are preset in the respective registers 25 by the initial value setting terminal 21, and the initial values are, from the upper side, N-m~N-1. Furthermore, in FIG. 2, the output from the serial output terminal 24 is denoted by do(i) where i is the number of times of shifting. Table 3 shows the outputs from the respective registers 25 at each shifting. The result of the 8-times shifting is obtained by substituting the result of shifting at each time for each output from the register at the 8th shifting in table 3. The data output from the respective registers 25 are transmitted through the logic circuit block 28 providing the following relationships between the input and the output and, consequently, data do7~do0 are output, in byte format, i.e., by 8 bits, from the parallel output terminals 29. These output data are descrambled.

$do7=g\text{-}1R\text{-}1(0)+g\text{-}2R\text{-}2(0)+g\text{-}3R\text{-}3(0)+\ldots+g\text{-}m+2R\text{-}m+2(0)+g\text{-}m+1R\text{-}m+1(0)+g\text{-}mR\text{-}m(0)+dn$ $do6=g\text{-}1R\text{-}1(1)+g\text{-}2R\text{-}2(1)+g\text{-}3R\text{-}3(1)+\ldots+g\text{-}m+2R\text{-}m+2(1)+g\text{-}m+1R\text{-}m+1(1)+g\text{-}mR\text{-}m(1)+dn\text{-}1$ $do5=g\text{-}1R\text{-}1(2)+g\text{-}2R\text{-}2(2)+g\text{-}3R\text{-}3(2)+\ldots+g\text{-}m+2R\text{-}m+2(2)+g\text{-}m+1R\text{-}m+1(2)+g\text{-}mR\text{-}m(2)+dn\text{-}2$ $do4=g\text{-}1R\text{-}1(3)+g\text{-}2R\text{-}2(3)+g\text{-}3R\text{-}3(3)+\ldots+g\text{-}m+2R\text{-}m+2(3)+g\text{-}m+1R\text{-}m+1(3)+g\text{-}mR\text{-}m(3)+dn\text{-}3$ $do3=g\text{-}1R\text{-}1(4)+g\text{-}2R\text{-}2(4)+g\text{-}3R\text{-}3(4)+\ldots+g\text{-}m+2R\text{-}m+2(4)+g\text{-}m+1R\text{-}m+1(4)+g\text{-}mR\text{-}m(4)+dn\text{-}4$ $do2=g\text{-}1R\text{-}1(5)+g\text{-}2R\text{-}2(5)+g\text{-}3R\text{-}3(5)+\ldots+g\text{-}m+2R\text{-}m+2(5)+g\text{-}m+1R\text{-}m+1(5)+g\text{-}mR\text{-}m(5)+dn\text{-}5$ $do1=g\text{-}1R\text{-}1(6)+g\text{-}2R\text{-}2(6)+g\text{-}3R\text{-}3(6)+\ldots+g\text{-}m+2R\text{-}m+2(6)+g\text{-}m+1R\text{-}m+1(6)+g\text{-}mR\text{-}m(6)+dn\text{-}6$ $do0=g\text{-}1R\text{-}1(7)+g\text{-}2R\text{-}2(7)+g\text{-}3R\text{-}3(7)+\ldots+g\text{-}m+2R\text{-}m+2(7)+g\text{-}m+1R\text{-}m+1(7)+g\text{-}mR\text{-}m(7)+dn\text{-}7$ Thereafter, when the next one byte data are input as information data, the above-described R-m(8)~R-1(8) are used as the next initial values N-m~N-1, and the same operation as described above is performed. When the input data are L byte, the operation Is repeated by L times.

In order to facilitate and embody the explanation, the generating polynomial is simplified to $G(X)=1+X^{-6}+X^{-7}$, and the data polynomial is simplified to 1 byte, i.e., $D(X)=d7X^7+d6X^6+d5X^5+d4X^4+d3X^3+d2X^2+d1X+d0$, and outputs from the respective registers 25 are obtained as shown in table 4. From table 4, the outputs from the respective registers 25 are obtained as follows:

$R-7(8) = R-6(7)$ $= R-5(6)$ $= R-4(5)$ $= R-3(4)$ $= R-2(3)$ $= R-1(2)$ $= d6$

-continued $$R-6(8) = d5$$

$$R-5(8) = d4$$

$$R-4(8) = d3$$

$$R-3(8) = d2$$

$$R-2(8) = d1$$

$$R-1(8) = d0$$

The data output from the respective registers 25 are transmitted through the logic circuit block 28 providing the following relationships between the input and the output and, consequently, descrambled data are output, in byte format, from the parallel output terminals 29.

$$do7=R\text{-}6(0)+R\text{-}7(0)+d7$$

$$do6=R\text{-}6(1)+R\text{-}7(1)+d6$$

$$do5=R\text{-}6(2)+R\text{-}7(2)+d5$$

$$do4=R\text{-}6(3)+R\text{-}7(3)+d4$$

$$do3=R\text{-}6(4)+R\text{-}7(4)+d3$$

$$do2=R\text{-}6(5)+R\text{-}7(5)+d2$$

$$do1=R\text{-}6(6)+R\text{-}7(6)+d1$$

$$do0=R\text{-}6(7)+R\text{-}7(7)+d0$$

When the next one byte data are input as information data, the above-described R-7(8)~R-1(8) are used as the next initial values N-7~N-1, and the same operation as described above is performed. When data are L byte, the operation is repeated by L times.

According to the second embodiment of the invention, since the data descrambling method employs the logic circuit block 28 that operates each of serial outputs for 8-times shifting obtained in the conventional descrambling method, input data are descrambled with 8 bits as a unit, and data in byte format are obtained as descrambled output data. Therefore, the troubles in converting descrambled data in binary format into byte data by serial to parallel conversion as in the conventional method are eliminated.

Further, the shift registers 25 are disposed on the input side while the logic circuit 28 is disposed on the output side, and data input and data output are performed with the same clock. Therefore, a data descrambling apparatus is easily constituted as a synchronous circuit.

While data are descrambled with a byte (8 bits) as a unit in this second embodiment of the invention, it is possible to descramble arbitrary bits, in a lump, using a similar descrambling method.

Embodiment 3

Figure 3:
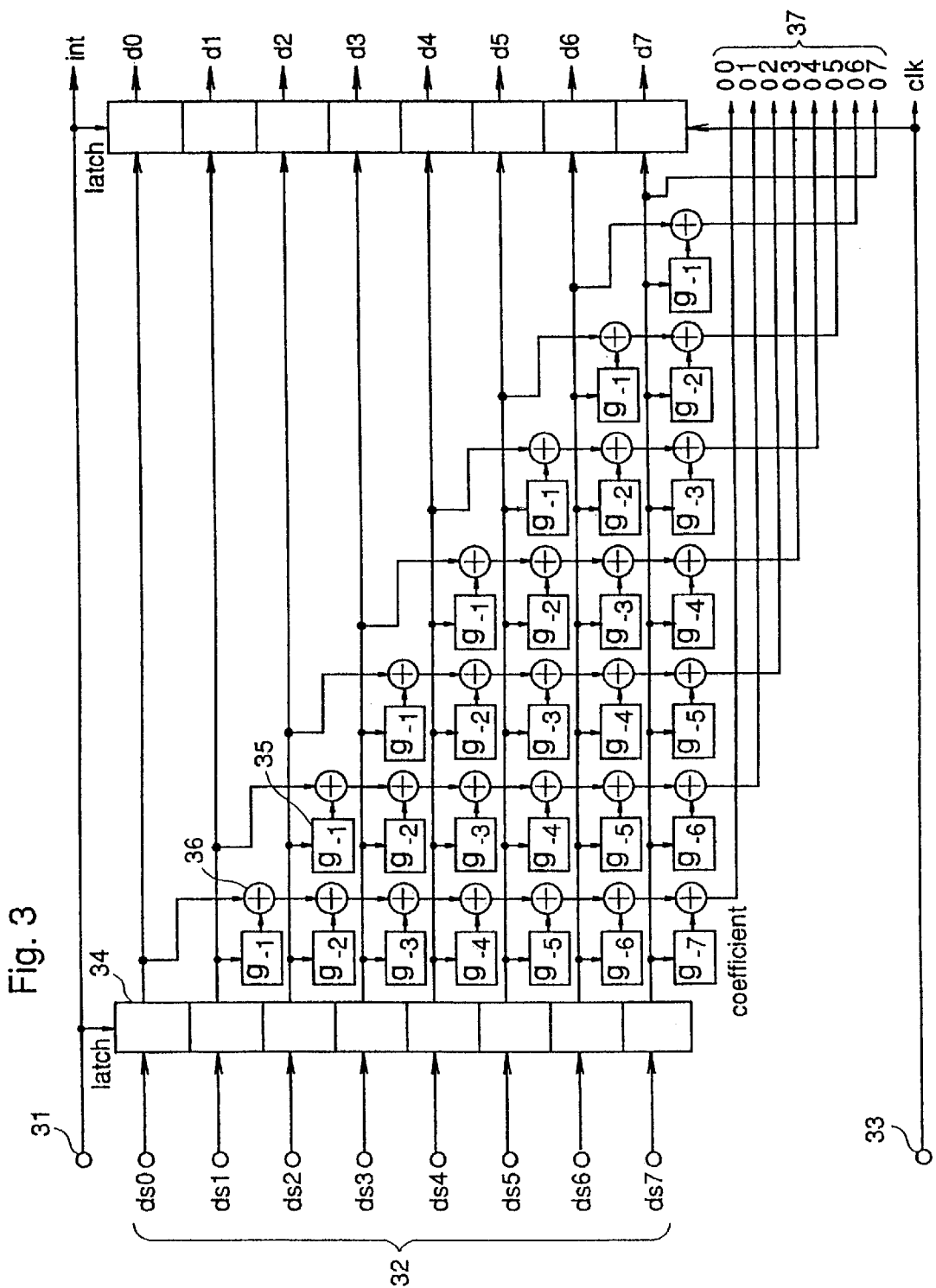
FIG. 3 is a diagram for explaining a principle of a data descrambling method according to a third embodiment of the present invention.
Figure 4:
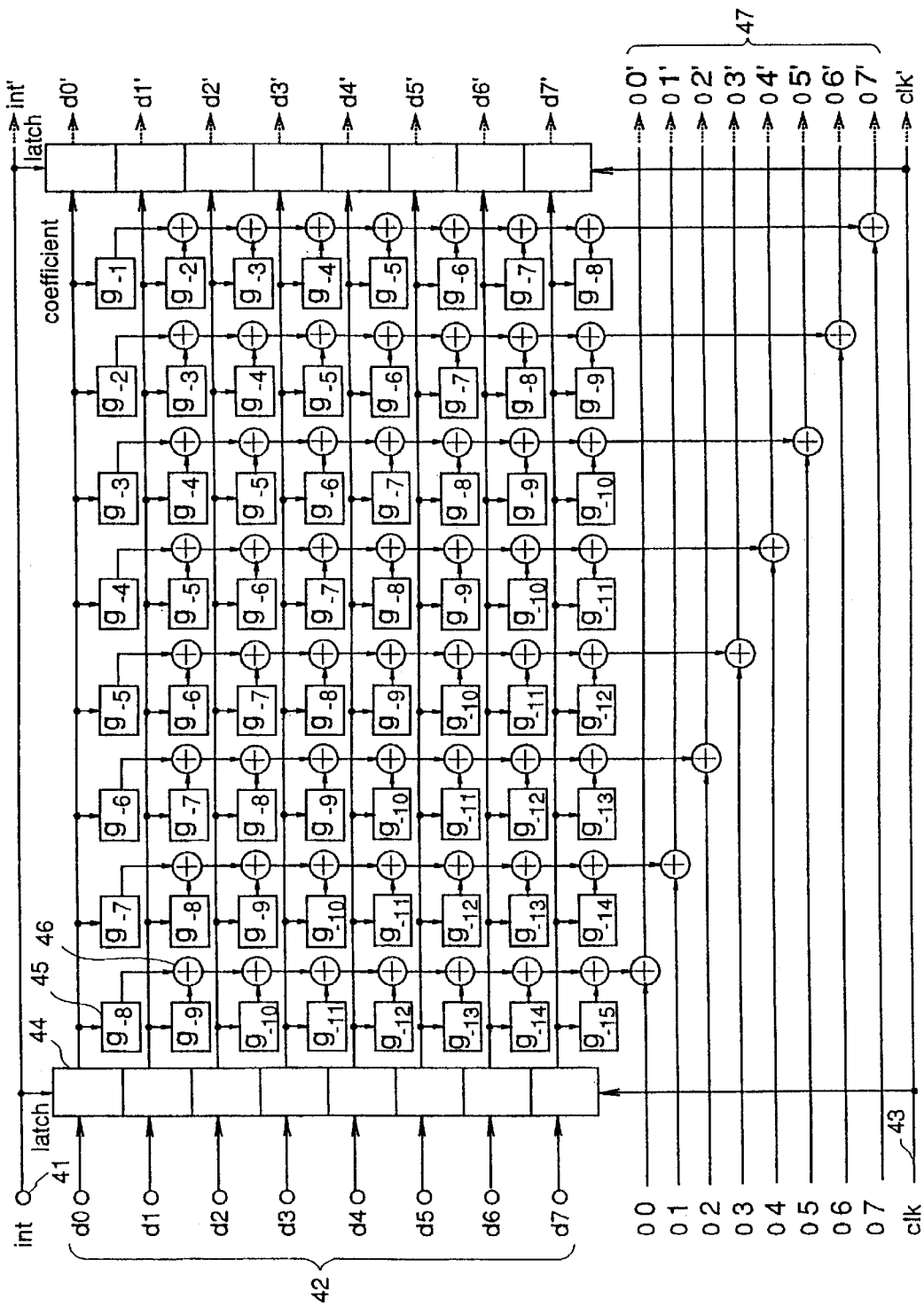
FIG. 4 is a diagram for explaining the principle of the data descrambling method according to the third embodiment of the present invention.
Figure 5:
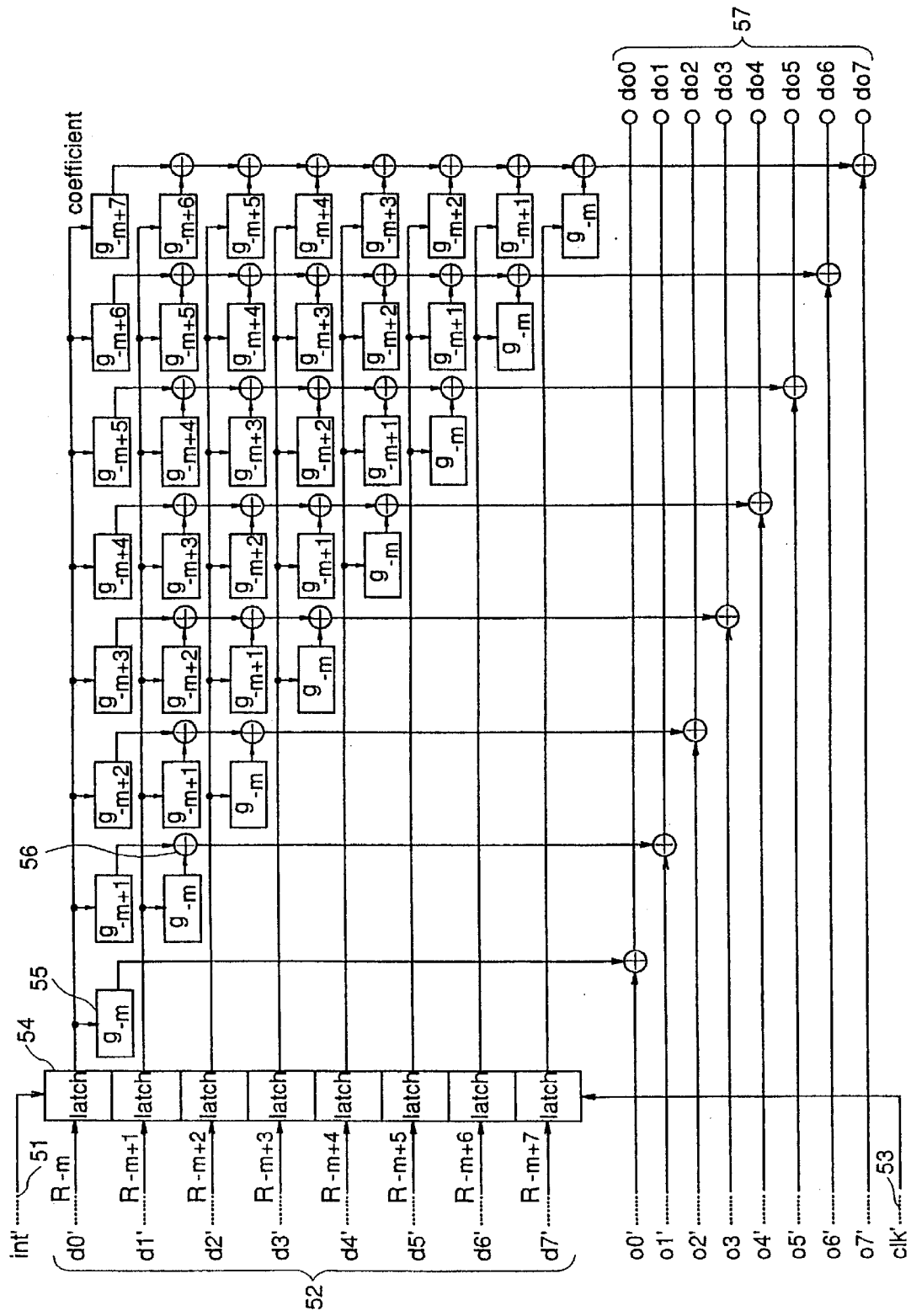
FIG. 5 is a diagram for explaining the principle of the data descrambling method according to the third embodiment of the present invention.

FIGS. 3, 4, and 5 are circuit diagrams for explaining a data descrambling method in which data scrambled in binary format are descrambled in byte format when data are reproduced from a record medium or received in a communication system, according to a third embodiment of the present invention. FIGS. 3, 4, and 5 are connected in series in this order to form a single circuit. In FIG. 3, reference numeral 31 designates an initial value setting terminal, numeral 32 designates data input terminals, numeral 33 designates a clock input terminal, numeral 34 designates 8-bit parallel latches, numeral 35 designates coefficient multipliers, numeral 36 designates mod 2 adders, and numeral 37 designates data output terminals. In FIG. 4, reference numeral 41 designates an initial value setting terminal, numeral 42 designates data input terminals, numeral 43 designates a clock input terminal, numeral 44 designates 8-bit parallel latches, numeral 45 designates coefficient multipliers, numeral 56 designates mod 2 adders, and numeral 57 designates data output terminals. In FIG. 5, reference numeral 51 designates an initial value setting terminal, numeral 52 designates data input terminals, numeral 53 designates a clock input terminal, numeral 54 designates 8-bit parallel latches, numeral 55 designates coefficient multipliers, numeral 56 designates mod 2 adders, and numeral 57 designates data output terminals.

A description is given of a principle of descrambling data, which are scrambled in binary format, in byte format.

In this third embodiment of the invention, in order to treat scrambled data with a byte as a unit, data are input by 8 bits in parallel. In advance of input of scrambled data, initial values, 0 or 1, are set in the registers 34 which are constituted by 8 bits in parallel. Next, scrambled information data, i.e., byte data, are input to the data input terminals 32 in parallel, and the input data are shifted, by times as many as the byte number of the scrambled information data, in response to clocks synchronized with data input to the clock input terminal 33. Meanwhile, descrambled information data are output from the output terminals 37. Assuming that the scrambled data are Ds, the descrambled data are Do, and the generating polynomial G(X) is given by $$G(X)=1+g\text{-}1X^{-1}+g\text{-}2X^{-2}+\ldots+g\text{-}m+2X^{-m+2}+g\text{-}m+1X^{-m+1}+g\text{-}mX^{-m}$$

the following relationship stands between the scrambled data Ds and the descrambled data Do.

$$Do(i)=Ds(i+m)\times G(X)$$

wherein i is the order of the data scrambled in binary format. The data input is performed in byte, i.e., Ds(0)~Ds(7), Ds(8)~Ds(15), . . . , and the data output is also performed in byte, i.e., Do(0) Do(7), Do(8)~Do(15), . . . . The data Do(0)~Do(7), which are output first, are represented by $$Do(0) = Ds(m) \times G(X)$$
$$= Ds(m) + g - 1Ds(m-1) + g - 2Ds(m-2) + \ldots +$$
$$g - m + 2Ds(2) + g - m + 1Ds(1) + g - mDs(0)$$
$$Do(1) = Ds(m+1) \times G(X)$$
$$= Ds(m+1) + g - 1Ds(m) + g - 2Ds(m-1) + \ldots +$$
$$g - m + 2Ds(3) + g - m + 1Ds(2) + g - mDs(1)$$
$$Do(2) = Ds(m+2) \times G(X)$$
$$= Ds(m+2) + g - 1Ds(m+1) + g - 2Ds(m) + \ldots +$$
$$g - m + 2Ds(4) + g - m + 1Ds(3) + g - mDs(2)$$
$$Do(3) = Ds(m+3) \times G(X)$$
$$= Ds(m+3) + g - 1Ds(m+2) + g - 2Ds(m+1) + \ldots +$$
$$g - m + 2Ds(5) + g - m + 1Ds(4) + g - mDs(3)$$
$$Do(4) = Ds(m+4) \times G(X)$$
$$= Ds(m+4) + g - 1Ds(m+3) + g - 2Ds(m+2) + \ldots +$$
$$g - m + 2Ds(6) + g - m + 1Ds(5) + g - mDs(4)$$

$$Do(5) = Ds(m+5) \times G(X)$$
$$= Ds(m+5) + g-1Ds(m+4) + g-2Ds(m+3) + \ldots +$$
$$g-m+2Ds(7) + g-m+1Ds(6) + g-mDs(5)$$
$$Do(6) = Ds(m+6) \times G(X)$$
$$= Ds(m+6) + g-1Ds(m+5) + g-2Ds(m+4) + \ldots +$$
$$g-m+2Ds(8) + g-m+1Ds(7) + g-mDs(6)$$
$$Do(7) = Ds(m+7) \times G(X)$$
$$= Ds(m+7) + g-1Ds(m+6) + g-2Ds(m+5) + \ldots +$$
$$g-m+2Ds(9) + g-m+1Ds(8) + g-mDs(7)$$

Here, do0, do1, do2, do3, do4, do5, do6, and do7 shown in FIG. 5 are matched with Do(0), Do(1), Do(2), Do(3), Do(4), Do(5), Do(6), and Do(7), respectively, whereby the polynomial expression of data is converted to a polynomial expression given by outputs from the output terminals and the registers.

$$do0 = R0 + g-1R-1 + g-2R-2 + \ldots + g-m+2R-m+2 + g-m+1R-m+1 + g-mR-m$$

$$do1 = R1 + g-1R0 + g-2R-1 + \ldots + g-m+2R-m+3 + g-m+1R-m+2 + g-mR-m+1$$

$$do2 = R2 + g-1R1 + g-2R0 + \ldots + g-m+2R-m+4 + g-m+1R-m+3 + g-mR-m+2$$

$$do3 = R3 + g-1R2 + g-2R1 + \ldots + g-m+2R-m+5 + g-m+1R-m+4 + g-mR-m+3$$

$$do4 = R4 + g-1R3 + g-2R2 + \ldots + g-m+2R-m+6 + g-m+1R-m+5 + g-mR-m+4$$

$$do5 = R5 + g-1R4 + g-2R3 + \ldots + g-m+2R-m+7 + g-m+1R-m+6 + g-mR-m+5$$

$$do6 = R6 + g-1R5 + g-2R4 + \ldots + g-m+2R-m+8 + g-m+1R-m+7 + g-mR-m+6$$

$$do7 = R7 + g-1R6 + g-2R5 + \ldots + g-m+2R-m+9 + g-m+1R-m+8 + g-mR-m+7$$

Consequently, it is verified that the parallel data scrambled in binary format can be descrambled with a byte as a unit, i.e., by 8 bits in parallel, in the circuit structure shown in FIGS. 3, 4, and 5.

Figure 6:
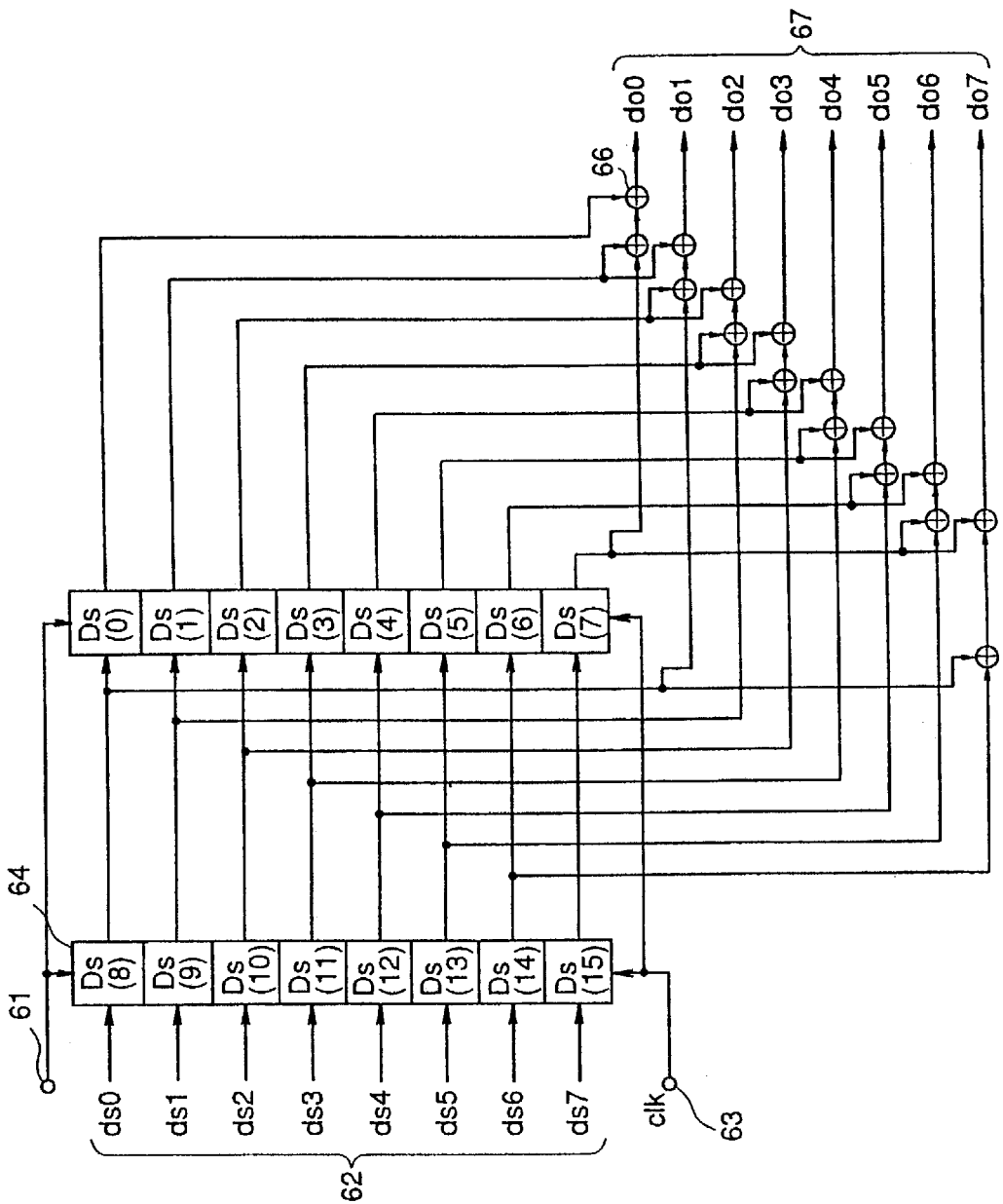
FIG. 6 is a diagram for explaining the principle of the data descrambling method according to the third embodiment in case where a generating polynomial, $G(X) = 1 + x^{-6} + X^{-7}$, is employed.

In order to facilitate and embody the explanation, the generating polynomial G(X) is simplified to $G(X)=1+X^{-6}+X^{-7}$. FIG. 6 shows a circuit structure for descrambling in this case. In FIG. 6, reference numeral 61 designates an initial value setting terminal, numeral 62 designates data input terminals, numeral 63 designates a clock input terminal, numeral 64 designates 8-bit parallel latches, numeral 66 designates mod 2 adders, and numeral 67 designates data output terminals.

Data output from the 8-bit parallel output terminals are represented by $$Do(0) = Ds(7) \times G(X)$$
$$= Ds(7) + Ds(1) + Ds(0) = do0$$

$$Do(1) = Ds(8) \times G(X)$$
$$= Ds(8) + Ds(2) + Ds(1) = do1$$
$$Do(2) = Ds(9) \times G(X)$$
$$= Ds(9) + Ds(3) + Ds(2) = do2$$
$$Do(3) = Ds(10) \times G(X)$$
$$= Ds(10) + Ds(4) + Ds(3) = do3$$
$$Do(4) = Ds(11) \times G(X)$$
$$= Ds(11) + Ds(5) + Ds(4) = do4$$
$$Do(5) = Ds(12) \times G(X)$$
$$= Ds(12) + Ds(6) + Ds(5) = do5$$
$$Do(6) = Ds(13) \times G(X)$$
$$= Ds(13) + Ds(7) + Ds(6) = do6$$
$$Do(7) = Ds(14) \times G(X)$$
$$= Ds(14) + Ds(8) + Ds(7) = do7$$

When the next one byte data are input as data to be descrambled, the data are input as 8-bit parallel data, and the same operation as described above is carried out. When the data are L byte, the operation is repeated by L times.

According to the third embodiment of the present invention, since the data descrambling method employs an exclusive OR circuit, i.e., the mod 2 adders, which operates each of parallel outputs corresponding to the serial outputs for 8-times shifting obtained in the conventional descrambling method, input data are descrambled with 8 bits as a unit, and data in byte format are obtained as descrambled data output. Therefore, the troubles in converting descrambled data in binary format into byte data by serial to parallel conversion as in the conventional method are dispensed with.

Further, since the descrambling apparatus according to this third embodiment has a structure that shifts data in parallel, the apparatus is easily constituted as a synchronous circuit, and clocks for operating the circuit can be unified.

While data are descrambled with a byte (8 bits) as a unit in this third embodiment of the invention, it is possible to descramble arbitrary bits, in a lump, using a similar descrambling method.

Embodiment 4

Figure 7:
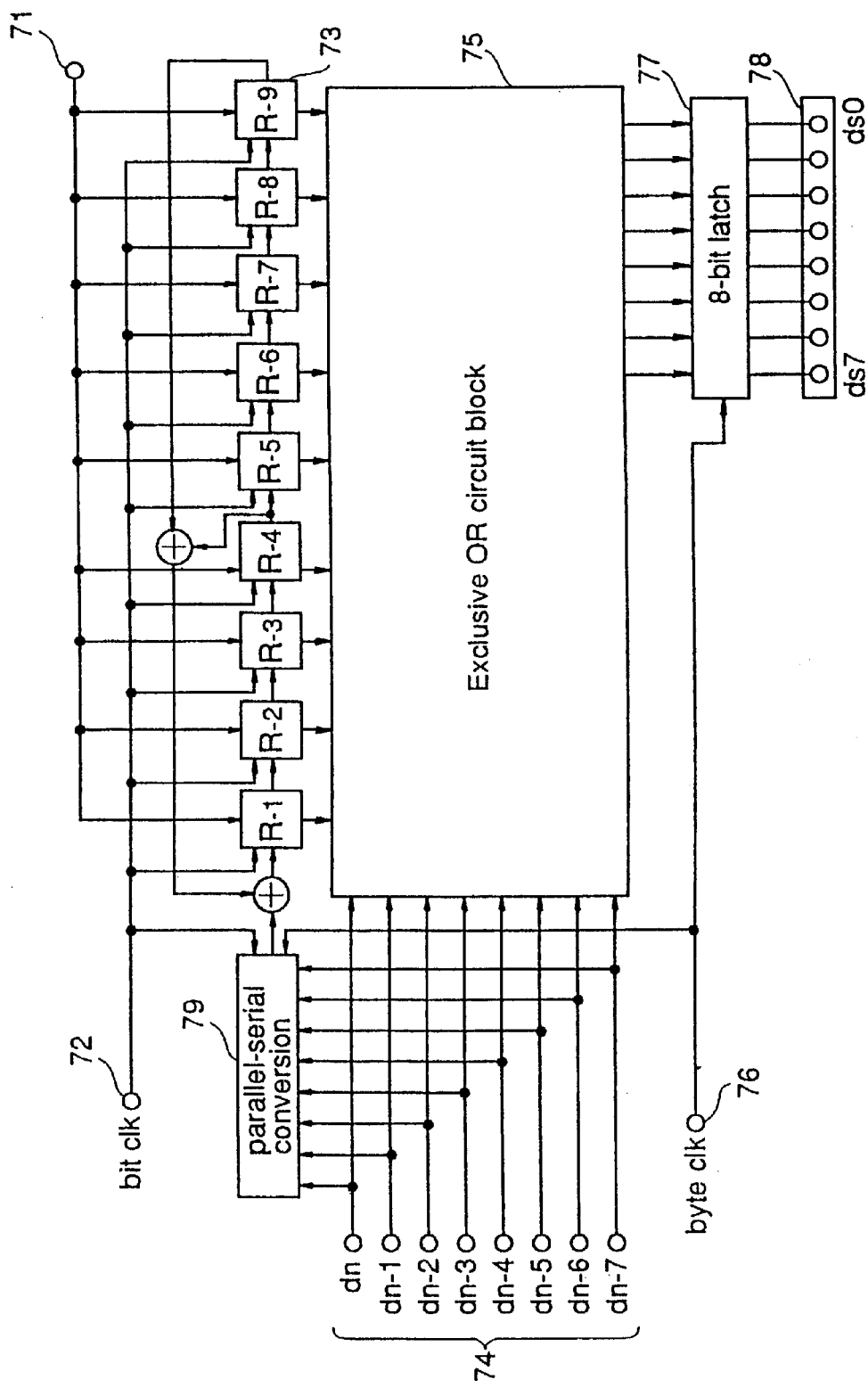
FIG. 7 is a diagram illustrating a structure of a data scrambling apparatus according to a fourth embodiment of the present invention.

A fourth embodiment of the present invention relates to a data scrambling apparatus that receives information data to be scrambled, by 8 bits in parallel and outputs scrambled data by 8 bits in parallel. FIG. 7 shows an example of the data scrambling apparatus. In order to facilitate and embody the explanation, a generating polynomial, $G(X)=1+X^{-4}+X^{-9}$, is employed.

In FIG. 7, reference numeral 71 designates an initial value setting terminal, numeral 72 designates a bit clock input terminal, numeral 73 designates serial shift registers, numeral 74 designates data input terminals, numeral 75 designates an exclusive OR circuit block, numeral 76 designates a byte clock input terminal, numeral 77 designates an 8-bit latch, numeral 78 designates a scrambled data output terminal, and numeral 79 designates a parallel to serial converting circuit.

First of all, initial values are set in the serial shift registers 73 by the initial value setting terminal 71. Then, information data to be scrambled are input, by 8 bits in parallel, to the data input terminals 74. At each input of 8 bits, the input data are converted to serial data by the parallel to serial converting circuit 79 and applied to the serial shift registers 73. The serial shift registers 73 receive the serial data and shift the serial data by 8 bits. From the above-mentioned generating polynomial, the serial shift registers 73 have nine stages. The bits ds0~ds7 at the 8-bit latch 77, the values of the serial shift registers 73, and the data dn~dn-7 have the following relationships.

$ds7=R-4(0)+R-9(0)+dn$ $ds6=R-4(1)+R-9(1)+dn-1$ $ds5=R-4(2)+R-9(2)+dn-2$ $ds4=R-4(3)+R-9(3)+dn-3$ $ds3=R-4(4)+R-9(4)+dn-4$ $ds2=R-4(5)+R-9(5)+dn-5$ $ds1=R-4(6)+R-9(6)+dn-6$ $ds0=R-4(7)+R-9(7)+dn-7$ wherein i in R-k(i) denotes the number of times of data shifting. The scrambled data are stored in the 8-bit latch 77. Byte clocks synchronized with the output timing are input to the clock input terminal 76, and the data are output from the 8-bit latch 77 toward the scrambled data output terminal 78 at the timing of the clocks. In this way, information data to be scrambled in binary format are input in byte format, i.e., by 8 bit in parallel, and scrambled data are output in byte format, i.e., by 8 bits in parallel.

According to this fourth embodiment of the invention, since the data scrambling apparatus is equipped with the exclusive OR circuit block 75 which operates each of outputs corresponding to the serial outputs for the 8-times shifting obtained in the conventional data scrambling apparatus, input data are scrambled with 8 bits as a unit, and data in byte format are obtained as scrambled output data. Therefore, the troubles in converting scrambled data in binary format into byte data by serial to parallel conversion as in the conventional apparatus are dispensed with.

Further, since the shift registers are disposed on the input side while the logic circuit is disposed on the output side, the apparatus is easily constituted as a synchronous circuit in regard to input and output of data, and clocks for operating the circuit can be unified.

While data are scrambled with a byte (8 bits) as a unit in this fourth embodiment of the invention, it is possible to scramble arbitrary bits, in a lump, using a similar scrambling apparatus.

Embodiment 5

Figure 8:
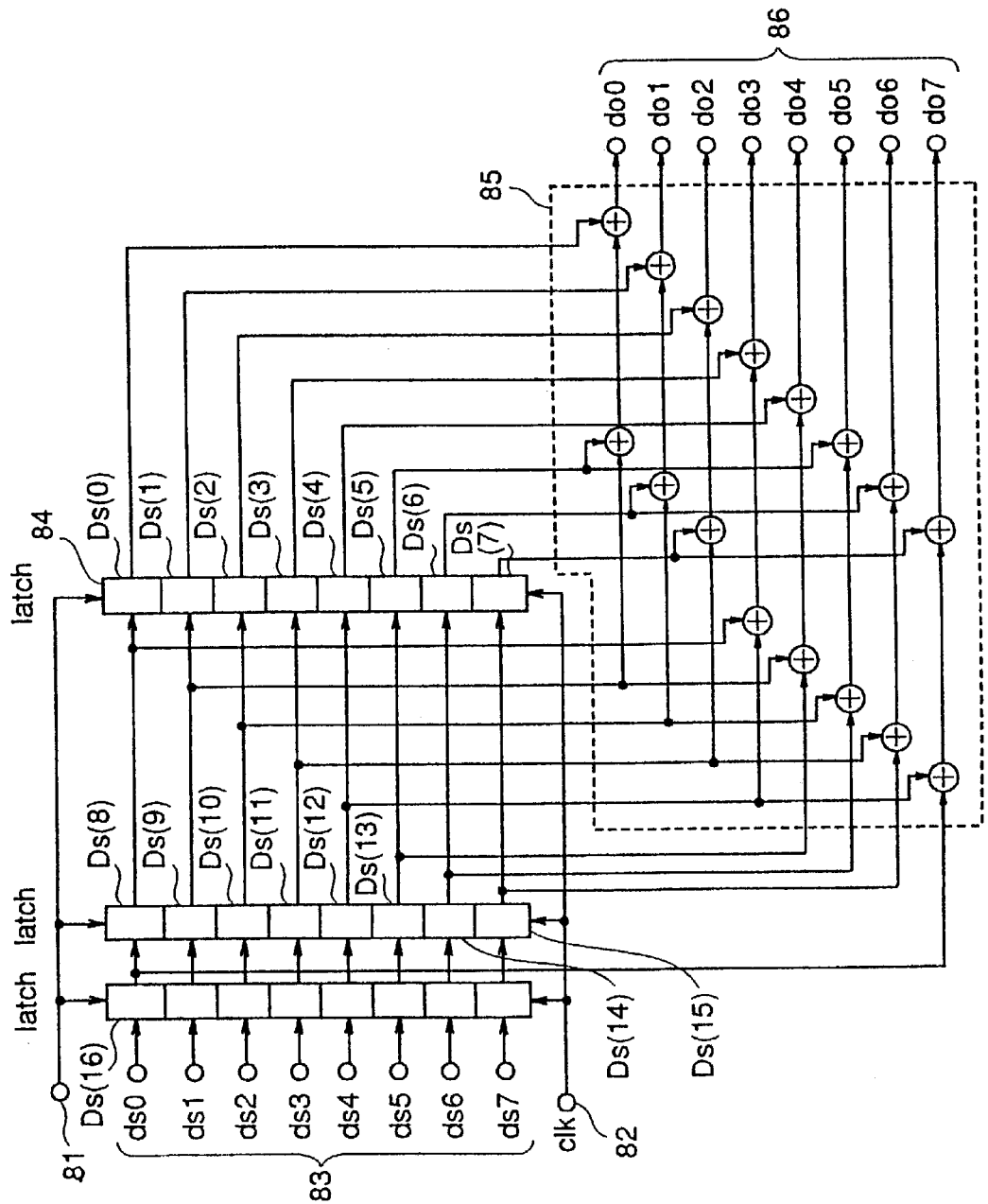
FIG. 8 is a diagram illustrating a structure of a data descrambling apparatus according to a fifth embodiment of the present invention.

A fifth embodiment of the invention relates to a data descrambling apparatus which receives information data, which are scrambled in binary format, by 8 bits in parallel, descrambles the input data, and outputs the descrambled data by 8 bits in parallel. FIG. 8 shows an example of the descrambling apparatus. In order to facilitate and embody the explanation, a generating polynomial $G(X)=1+X^{-4}+X^{-9}$ is employed.

In FIG. 8, reference numeral 81 designates an initial value setting terminal, numeral 82 designates a clock input terminal, numeral 83 designates scrambled input terminals, numeral 84 designates 8-bit parallel shift registers, numeral 85 designates an exclusive OR circuit block, and numeral 86 designates descrambled data output terminals.

First of all, initial values are input to the 8-bit parallel shift registers 84 from the initial value setting terminal 81. Next, information data to be descrambled are input to the scrambled data input terminals 83 by 8 bits in parallel. The input information data are input to the 8-bit parallel shift registers 84. Then, the data are shifted while being synchronized with clocks input to the clock input terminal 82, transmitted through the exclusive OR circuit block 85, and descrambled. The descrambled data are output, in parallel, from the descrambled data output terminals 86. From the above-mentioned generating polynomial, the 8-bit parallel shift registers 84 have three stages. As shown in FIG. 8, the respective bits at the descrambled data output terminals 86 and the respective registers of the 8-bit parallel shift registers 84 have the following relationships.

$do0=Ds(9)+Ds(5)+Ds(0)$ $do1=Ds(10)+Ds(6)+Ds(1)$ $do2=Ds(11)+Ds(7)+Ds(2)$ $do3=Ds(12)+Ds(8)+Ds(3)$ $do4=Ds(13)+Ds(9)+Ds(4)$ $do5=Ds(14)+Ds(10)+Ds(5)$ $do6=Ds(15)+Ds(11)+Ds(6)$ $do7=Ds(16)+Ds(12)+Ds(7)$

In this way, a data descrambling apparatus that receives information data, which are scrambled in binary format, in byte format, i.e., by 8 bits in parallel, descrambles the input data in byte format, and outputs the descrambled data, is realized.

According to the fifth embodiment of the invention, since the data descrambling apparatus is equipped with the exclusive OR circuit block 85 that operates each of outputs corresponding to the serial outputs for 8-times shifting obtained in the conventional data descrambling apparatus, input data are descrambled with 8 bits as a unit, and data in byte format are obtained as descrambled output data. Therefore, the troubles in converting descrambled data in binary format to byte data by serial to parallel conversion as in the conventional apparatus are dispensed with.

In this fifth embodiment, since the descrambling apparatus has a structure that shifts data in parallel, the apparatus is easily constituted as a synchronous circuit, and clocks for operating the circuit are unified. Furthermore, since the data are not serially shifted, the number of the registers is reduced and, further, the number of the exclusive OR circuits is also reduced whereas many exclusive OR circuits are required according to the kind of the logical formula in the second embodiment of the invention. As a result, the circuit scale is significantly reduced.

While data are descrambled with a byte (8 bits) as a unit in this fifth embodiment of the invention, it is possible to descramble arbitrary bits, in a lump, using a similar descrambling apparatus.

Embodiment 6

Figure 9:
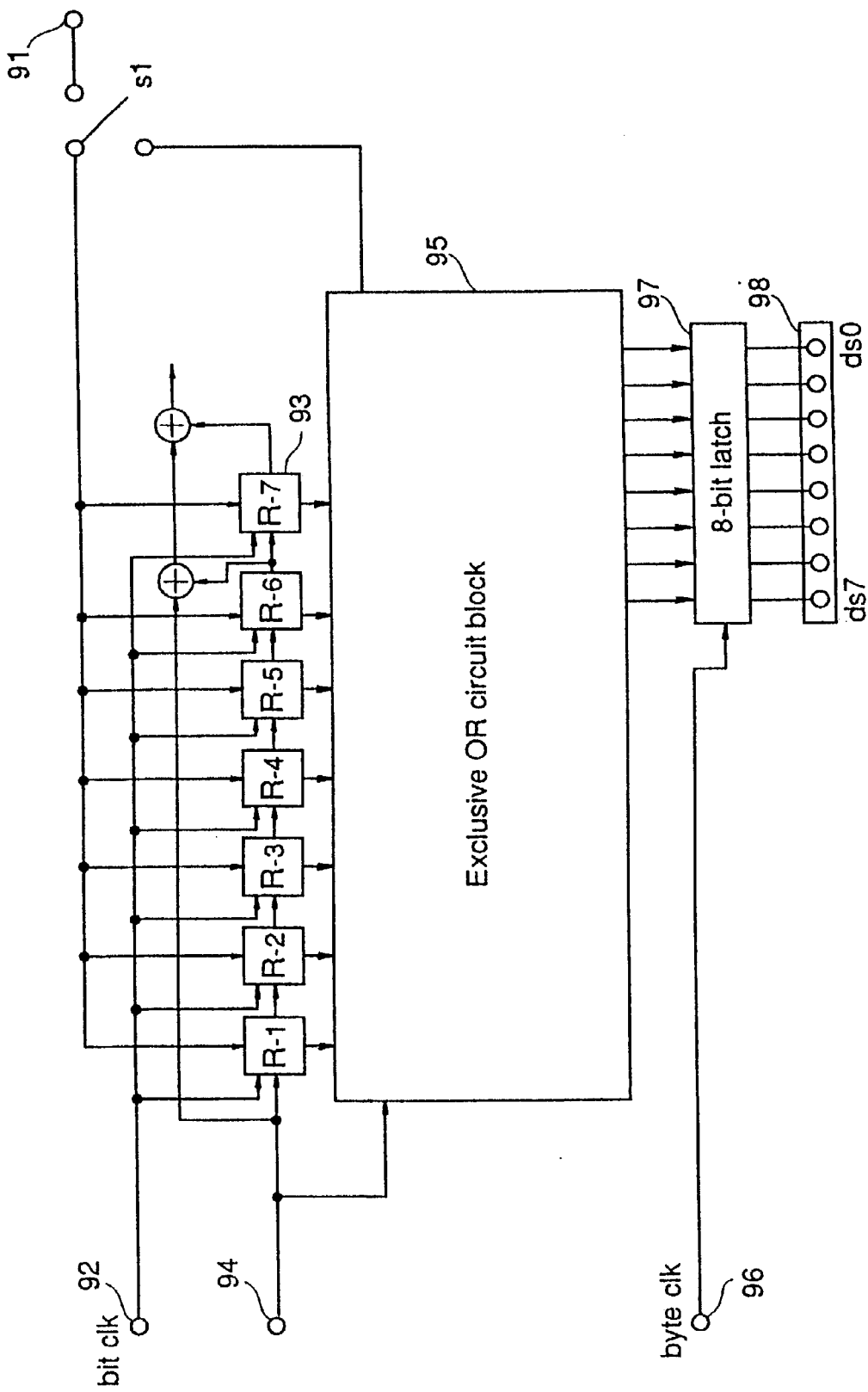
FIG. 9 is a diagram illustrating a structure of a data descrambling apparatus according to a sixth embodiment of the present invention.

A sixth embodiment of the present invention relates to a data descrambling apparatus that receives information data, which are scrambled in binary format, serially in binary format, descrambles the input information data, and outputs the descrambled data by 8 bits in parallel. FIG. 9 shows an example of the descrambling apparatus. In order to facilitate and embody the explanation, a generating polynomial, $G(X)=1+X^{-6}+X^{-7}$, is employed.

In FIG. 9, reference numeral 91 designates an initial value setting terminal, numeral 92 designates a bit clock input terminal, numeral 93 designates serial shift registers, numeral 94 designates a data input terminal, numeral 95 designates an exclusive OR circuit block, numeral 96 designates a bit clock input terminal, numeral 97 designates an 8-bit latch, numeral 98 designates a descrambled data output terminal, and character S1 designates a switch.

First of all, initial values are input to the serial shift registers 93 from the initial value setting terminal 91 by connecting the switch S1 to the initial value setting terminal 91. Next, data to be descrambled are serially input, in binary format, to the scrambled data input terminal 94 while being synchronized with bit clocks input to the bit clock input terminal 92.

At each input of data, the serial shift registers 93 are shifted. From the above-mentioned generating polynomial, the serial shift registers 93 have seven stages. The respective bits do0~do7 of the 8-bit latch 97, the values of the respective registers of the serial shift registers 93, and the input data dn~dn-7 have the following relationships.

$do7 = R\text{-}6(0) + R\text{-}7(0) + dn$ $do6 = R\text{-}6(1) + R\text{-}7(1) + dn\text{-}1$ $do5 = R\text{-}6(2) + R\text{-}7(2) + dn\text{-}2$ $do4 = R\text{-}6(3) + R\text{-}7(3) + dn\text{-}3$ $do3 = R\text{-}6(4) + R\text{-}7(4) + dn\text{-}4$ $do2 = R\text{-}6(5) + R\text{-}7(5) + dn\text{-}5$ $do1 = R\text{-}6(6) + R\text{-}7(6) + dn\text{-}6$ $do0 = R\text{-}6(7) + R\text{-}7(7) + dn\text{-}7$ The descrambled data are stored in the 8-bit latch 97. Byte clocks synchronized with the output timing are input to the clock input terminal 96, and the data are output from the descrambled data output terminal 98 at the timing of these clocks.

When the switch S1 is connected to the exclusive OR circuit block 95, do7~do0 are input to the registers of the serial shift registers 93 as initial values for the next processing and, thereafter, the same operation as described above is performed, whereby next data input to the scrambled data input terminal 94 are descrambled.

In this way, a data descrambling apparatus that receives data, which are scrambled in binary format, serially in binary format, descrambles the input data, and outputs the descrambled data in byte format, i.e., by 8 bits in parallel, is realized.

According to the sixth embodiment of the present invention, since the data descrambling apparatus is equipped with the exclusive OR circuit block 95 that operates each of serial outputs for 8-times shifting obtained in the conventional descrambling apparatus, serially input data are descrambled with 8 bits as a unit, and data in byte format are obtained as descrambled output data. Therefore, the troubles in converting descrambled data in binary format to byte data by serial to parallel conversion as in the conventional apparatus are dispensed with. That is, without using a serial to parallel conversion circuit, when serial data are input, data descrambled in parallel are obtained.

Further, the shift registers are disposed on the input side while the logic circuit is disposed on the output side, and data input and data output are performed with the same clock. Therefore, the apparatus is easily constituted as a synchronous circuit.

While data are descrambled with a byte (8 bits) as a unit in this sixth embodiment of the invention, it is possible to descramble arbitrary bits, in a lump, using a similar descrambling apparatus.

Embodiment 7

Figure 10:
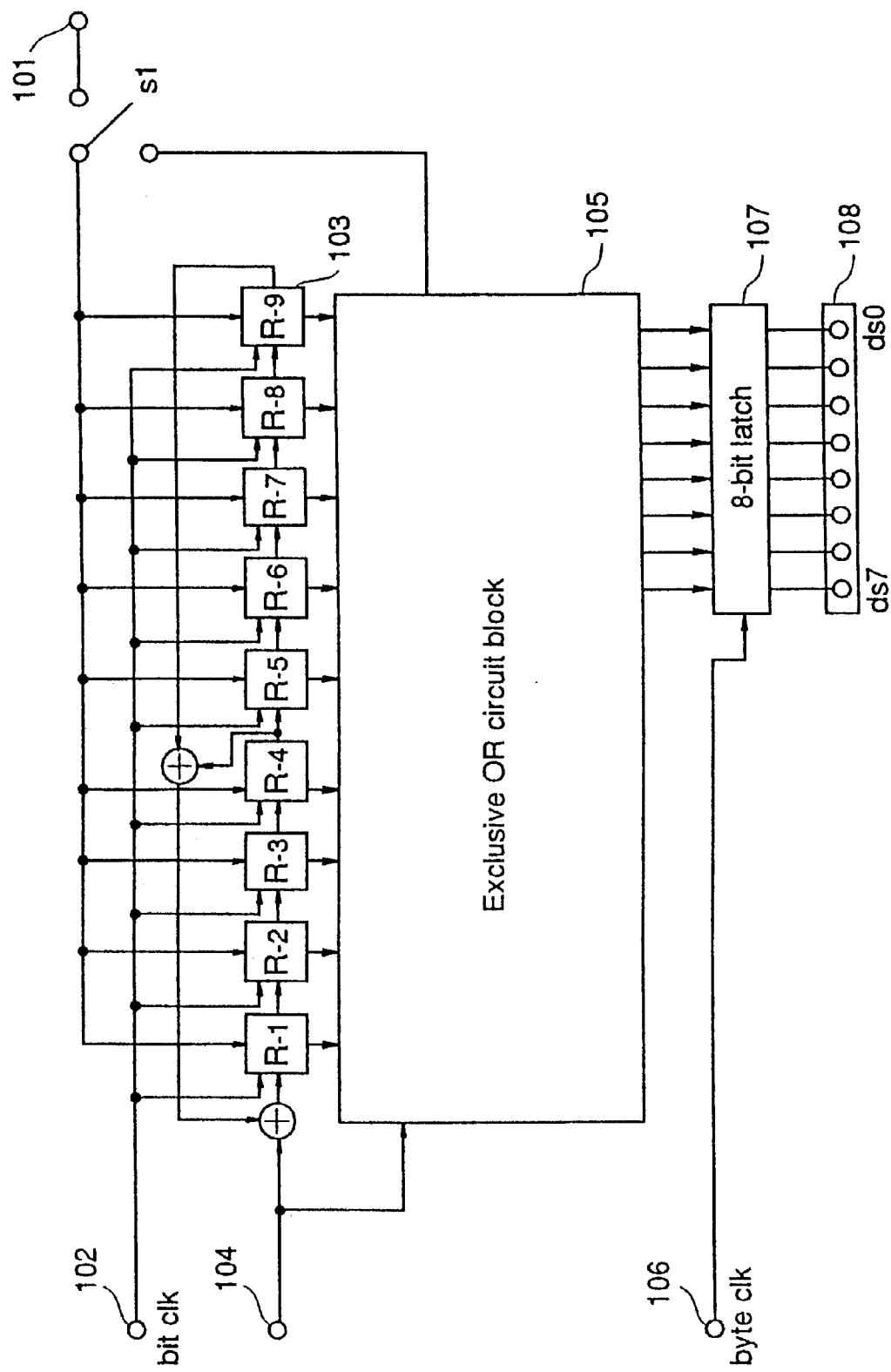
FIG. 10 is a diagram illustrating a structure of a data scrambling apparatus according to a seventh embodiment of the present invention.

A seventh embodiment of the present invention relates to a data scrambling apparatus that receives information data to be scrambled, serially in binary format, and outputs scrambled data by 8 bits in parallel. FIG. 10 shows an example of the scrambling apparatus. In order to facilitate and embody the explanation, a generating polynomial, $G(X) = 1 + X^{-4} + X^{-9}$, is employed.

In FIG. 10, reference numeral 101 designates an initial value setting terminal, numeral 102 designates a bit clock input terminal, numeral 103 designates serial shift registers, numeral 104 designates a data input terminal, numeral 105 designates an exclusive OR circuit block, numeral 106 designates a byte clock input terminal, numeral 108 designates an 8-bit latch, numeral 108 designates scrambled data output terminals, and character S1 designates a switch.

First of all, initial values are input to the serial shift registers 103 from the initial value setting terminal 101 by connecting the switch S1 to the initial value setting terminal 101. Next, data to be scrambled are serially input, in binary format, to the data input terminal 103 while being synchronized with bit clocks applied to the 8-bit latch 107 from the bit clock input terminal 102. At each input of data, the serial shift registers 103 are shifted. From the above-mentioned generating polynomial, the serial shift registers 103 have nine stages. The respective bits ds0~ds7 of the 8-bit latch 107, the respective registers of the serial shift registers 103, and the input data dn~dn-7 have the following relationships.

$ds7 = R\text{-}4(0) + R\text{-}9(0) + dn$ $ds6 = R\text{-}4(1) + R\text{-}9(1) + dn\text{-}1$ $ds5 = R\text{-}4(2) + R\text{-}9(2) + dn\text{-}2$ $ds4 = R\text{-}4(3) + R\text{-}9(3) + dn\text{-}3$ $ds3 = R\text{-}4(4) + R\text{-}9(4) + dn\text{-}4$ $ds2 = R\text{-}4(5) + R\text{-}9(5) + dn\text{-}5$ $ds1 = R\text{-}4(6) + R\text{-}9(6) + dn\text{-}6$ $ds0 = R\text{-}4(7) + R\text{-}9(7) + dn\text{-}7$ The scrambled data are stored in the 8-bit latch 107. Byte clocks synchronized with the output timing are input to the clock input terminal 106, and the data are output, in parallel, from the scrambled data output terminals 108 at the timing of these clocks.

When the switch S1 is connected to the exclusive OR circuit block 105, ds7~ds0 are input to the serial shift registers 103 as initial values for the next processing and, thereafter, the same operation as mentioned above is carried out, whereby next data input to the data input terminals 104 are scrambled.

In this way, a data scrambling apparatus that receives information data to be scrambled, serially in binary format, and outputs scrambled data in byte format, i.e., by 8 bits in parallel, is realized.

According to the seventh embodiment of the present invention, since the data scrambling apparatus is equipped with the exclusive OR circuit block 105 that operates each of serial outputs for 8-times shifting obtained in the conventional scrambling apparatus, input data are scrambled with 8 bits as a unit, and data in byte format are obtained as scrambled output data. Therefore, the troubles in converting scrambled data in binary format to byte data by serial to parallel conversion as in the conventional apparatus are dispensed with. That is, without using a serial to parallel conversion circuit, when serial data are input, data scrambled in parallel are obtained.

Further, the shift registers are disposed on the input side while the logic circuit is disposed on the output side, and data input and data output are performed with the same clock. Therefore, the apparatus is easily constituted as a synchronous circuit.

While data are scrambled with a byte (8 bits) as a unit in this seventh embodiment of the invention, it is possible to scramble arbitrary bits, in a lump, using a similar scrambling apparatus.

Embodiment 8

Figure 11:
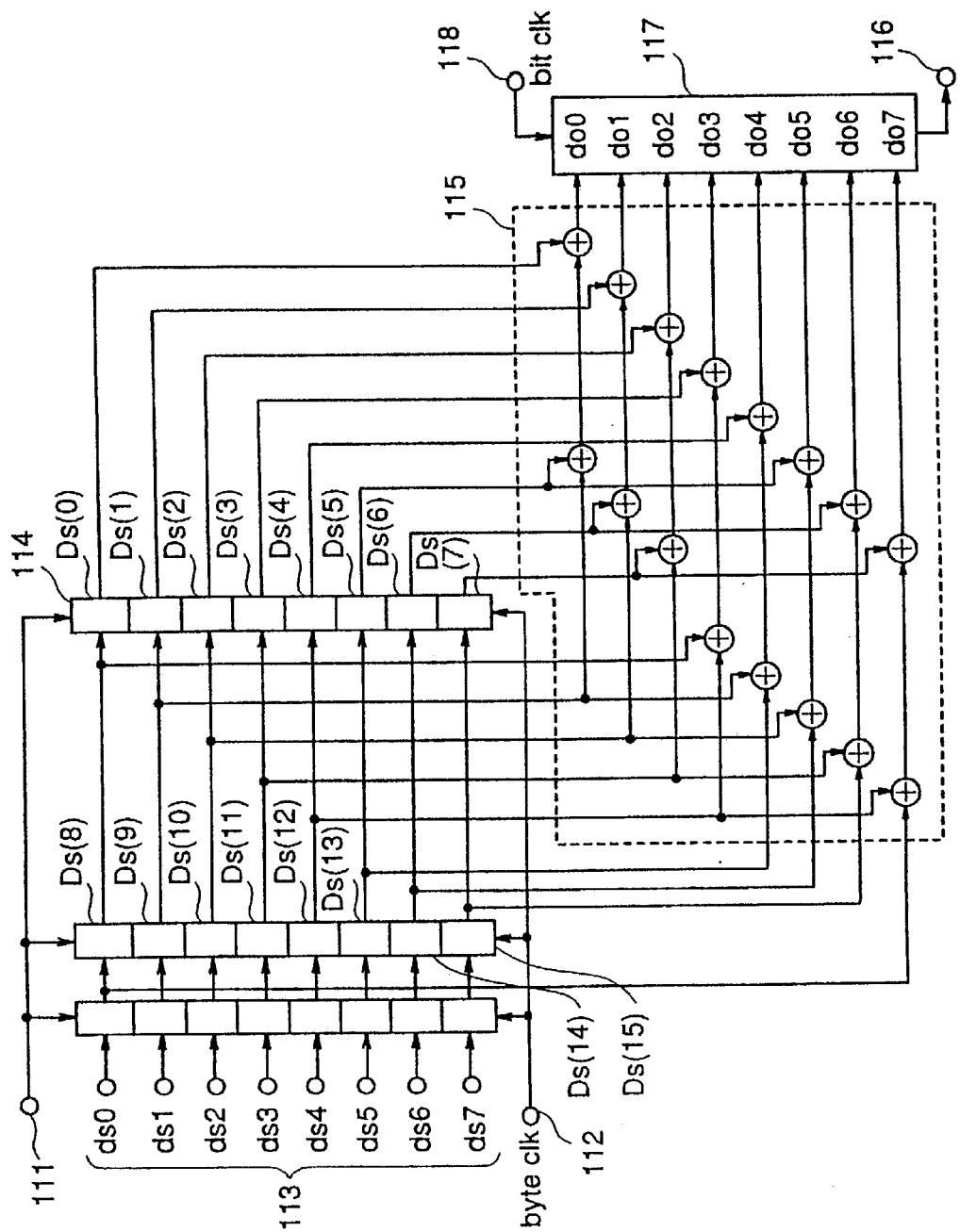
FIG. 11 is a diagram illustrating a structure of a data descrambling apparatus according to an eighth embodiment of the present invention.

An eighth embodiment of the present invention relates to a data descrambling apparatus that receives information data, which are scrambled in binary format, by 8 bits in parallel, descrambles the input data, and outputs the descrambled data serially in binary format. FIG. 11 shows an example of the descrambling apparatus. In order to facilitate and embody the explanation, a generating polynomial, $G(X)=1+X^{-4}+X^{-9}$, is employed.

In FIG. 11, reference numeral 111 designates an initial value setting terminal, numeral 112 designates a byte clock input terminal, numeral 113 designates scrambled data input terminals, numeral 114 designates 8-bit parallel shift registers, numeral 115 designates an exclusive OR circuit block, numeral 116 designates a descrambled data output terminal, numeral 117 designates a parallel to serial converting register, and numeral 118 designates a bit clock input terminal.

First of all, initial values are input to the 8-bit parallel shift registers 114 from the initial value setting terminal 111. Next, information data to be descrambled are input, by 8 bits in parallel, to the scrambled data input terminals 113. The information data are input to the 8-bit parallel shift registers 114, shifted while being synchronized with byte clocks input to the clock input terminal 112, and stored in the parallel to serial converting register 117 through the exclusive OR circuit block 115. Then, descrambled data are serially output in binary format from the descrambled data output terminal 116 while being synchronized with bit clocks input to the bit clock input terminal 118. From the above-mentioned generating polynomial, the 8-bit parallel shift registers 114 have 3 stages. The respective bits in the parallel to serial converting register 117 and the respective registers of the 8-bit parallel shift registers 114 have the following relationships.

$do0=Ds(9)+Ds(5)+Ds(0)$ $do1=Ds(10)+Ds(6)+Ds(1)$ $do2=Ds(11)+Ds(7)+Ds(2)$ $do3=Ds(12)+Ds(8)+Ds(3)$ $do4=Ds(13)+Ds(9)+Ds(4)$ $do5=Ds(14)+Ds(10)+Ds(5)$ $do6=Ds(15)+Ds(11)+Ds(6)$ $do7=Ds(16)+Ds(12)+Ds(7)$

In this way, a data descrambling apparatus that receives data, which are scrambled in binary data, by 8 bits in parallel, and outputs descrambled data serially in binary format, is realized.

According to the eighth embodiment of the invention, the data descrambling apparatus is equipped with the exclusive OR circuit block 115 that operates each of serial outputs for 8-times shifting obtained in the conventional descrambling apparatus, input data are descrambled with 8 bits as a unit, and the descrambled data are converted to serial data and output in binary format. Therefore, while the conventional descrambling apparatus, which converts input parallel data to serial data and descrambles the serial data, requires nine-stage registers and nine clocks, the descrambling apparatus according to this eighth embodiment requires only three-stage registers, so that delay time in the descrambling process is reduced.

While data are descrambled with a byte (8 bits) as a unit in this eighth embodiment of the invention, it is possible to descramble arbitrary bits, in a lump, using a similar descrambling apparatus.

Embodiment 9

Figure 12:
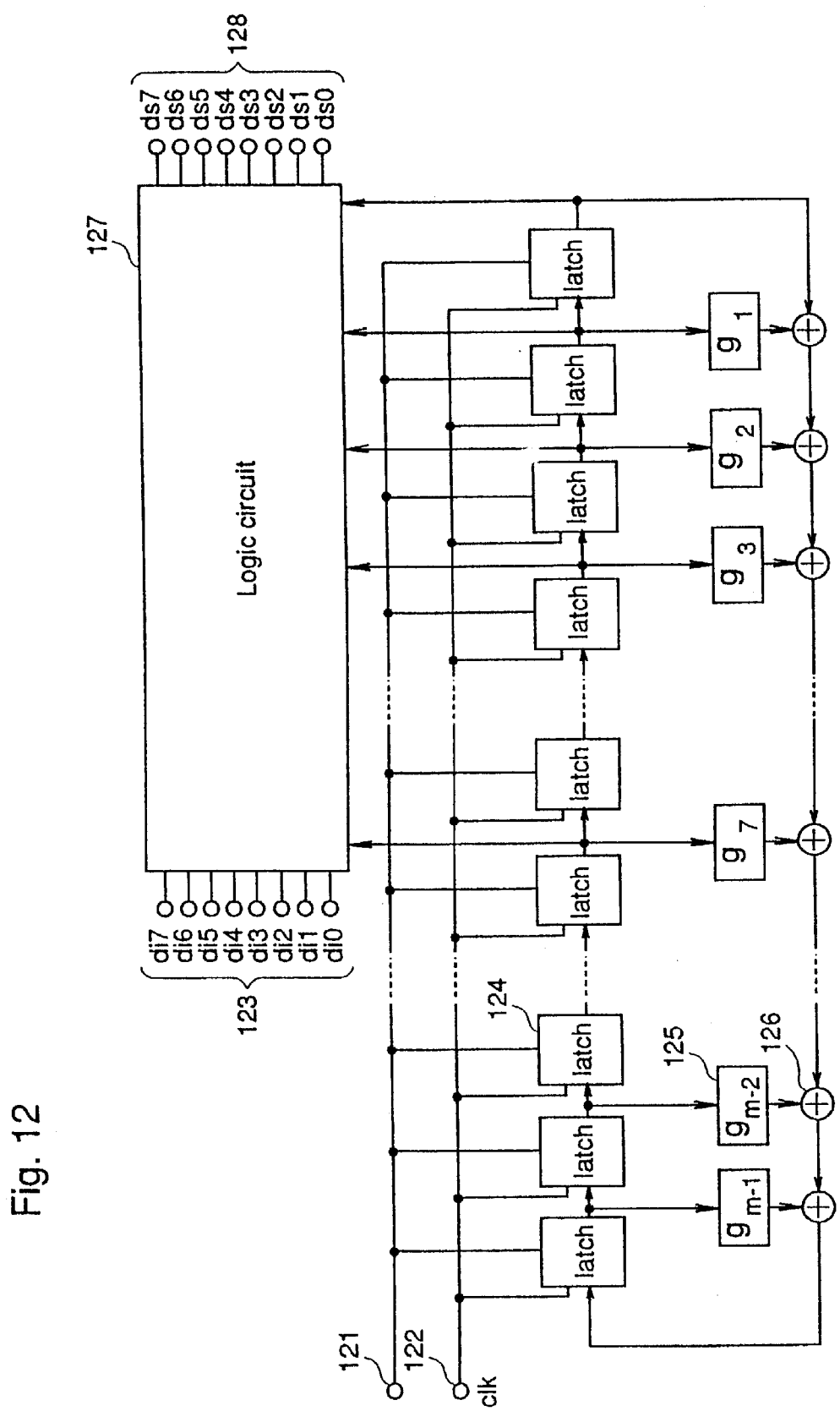
FIG. 12 is a diagram illustrating a structure of a data scrambling apparatus according to a ninth embodiment of the present invention.

FIG. 12 is a circuit diagram for explaining a data scrambling method in which binary format scrambling is performed, in parallel, with a byte as a unit, according to a ninth embodiment of the invention. Table 5 shows the operating state of the circuit shown in FIG. 12. In FIG. 12, reference numeral 121 designates an initial value setting terminal, numeral 122 designates a clock input terminal, numeral 123 designates data input terminals, reference numeral 124 designates registers, numeral 125 designates coefficient multipliers, numeral 126 designates mod 2 adders, numeral 127 designates a logic circuit block, and numeral 128 designates scrambled data output terminals.

First of all, a data scrambling method according to this ninth embodiment will be described and, thereafter, a principle of converting to a scrambling method for binary data will be described. In advance of the explanation, respective data are defined as follows. data polynomial:

$$D(X)=dnX^n+dn\text{-}1X^{n-1}+dn\text{-}2X^{n-2}+\ldots+d2X^2+d1X+d0$$

generating polynomial:

$$G(X)=1+g1X^1+g2X^2\ldots+gm\text{-}2\,X^{m-2}+gm\text{-}1X^{-1}+X^{-m}$$

In advance of input of binary data, initial values, i.e., 0 or 1, are set in the registers 124 by the initial value setting terminal 121. Next, information data, i.e., binary data, are input, in parallel, to the data input terminals 123, and the data in the respective registers 124 are shifted, by times as many as the bit number of the information data, in response to clocks synchronized with data input to the clock input terminal 122. Meanwhile, the information data take exclusive OR with the output from the rightmost register in FIG. 12 and are scrambled and output in parallel from the output terminals 128.

In this ninth embodiment, in order to treat information data with a byte as a unit, information data are input by 8 bits in parallel. At each input of 8 bits, a result of 8-times shifting of each latch is obtained. For this purpose, the latch outputs at each shifting are defined, from the upper side, Rm-1(i)~R0(i), as shown in table 5. Further, before the operation, initial values, i.e., 0 or 1, are preset in the respective latches by the initial value setting terminal, and the initial values are, from the upper side, Nm-1~N0. Here, i represents the number of times of shifting. Assuming that data are input serially in the order of dn, dn-1, dn-2, . . . , the input data and the output data have the following relationships.

$ds(0)=R0(0)+dn$ $ds(1)=R0(1)+dn\text{-}1$ $ds(2)=R0(2)+dn\text{-}2$

Therefore, when the logic circuit block 127 is constituted so that the respective latch outputs, the input data, and the output data have the following relationships when data are input by 8 bits in parallel, $ds0 = R0(0) + di0$ $ds1 = R0(1) + di2$ $ds2 = R0(2) + di2$ $ds3 = R0(3) + di3$ $ds4 = R0(4) + di4$ $ds5 = R0(5) + di5$ $ds6 = R0(6) + di6$ $ds7 = R0(7) + di7$ data are scrambled and output, in byte format, i.e., by 8 bits, through the logic circuit block 127 from the parallel output terminals 128. Thereafter, when the next one byte data are input as information data, the same operation as described above is performed using Rm-1(8)~R0(8) as initial values Nm-1~N0.

In the data scrambling method according to the ninth embodiment of the present invention, initial values are input to the serial shift registers and shifted, data output from the serial shift registers are subjected to mod 2 addition, i.e., multiplied by coefficients, and data so produced are fed back to the input of the serial shift registers. Meanwhile, the data output from the serial shift registers and data input in parallel are input to the logic circuit, and scrambled data are obtained in parallel. Therefore, parallelization is realized in a scrambling method different from the self-closing type scrambling method according to the aforementioned embodiments. In the conventional scrambling method in which data are serially processed, in order to realize parallel input or parallel output, input parallel data must be converted to serial data to be scrambled and, after the scrambling, the serial data must be converted to parallel data to be output. In the scrambling method according to this ninth embodiment, this trouble in the conventional method is dispensed with, and data input and data output can be performed by 8 bits in parallel. As a result, the circuit structure is simplified, and an I/O synchronized type circuit is realized.

While data are scrambled with a byte (8 bits) as a unit in this ninth embodiment of the invention, it is possible to scramble arbitrary bits, in a lump, using a similar scrambling apparatus.

Embodiment 10

Figure 13:
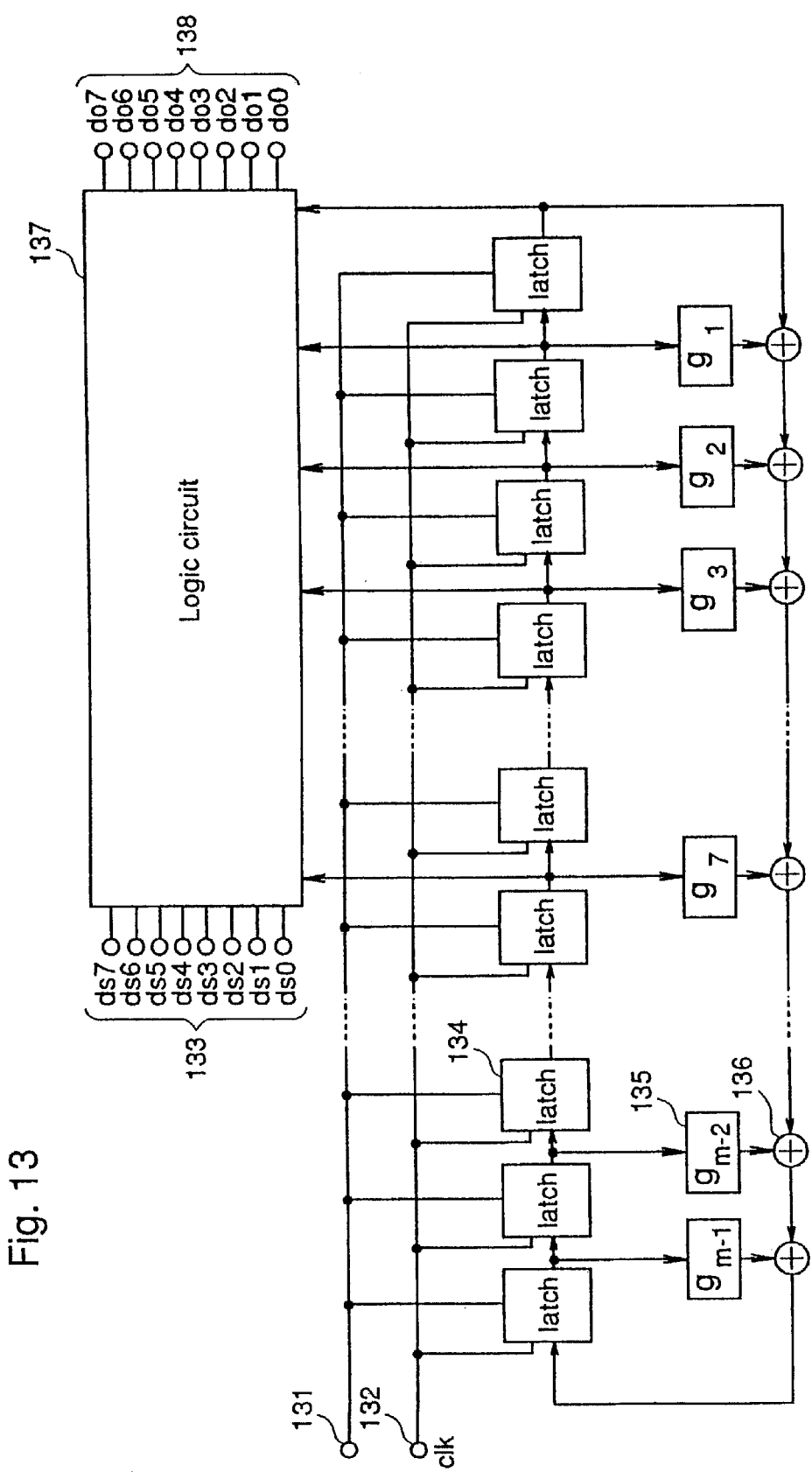
FIG. 13 is a diagram illustrating a structure of a data descrambling apparatus according to a tenth embodiment of the present invention.

FIG. 13 is a circuit diagram for explaining a data descrambling method in which binary format descrambling is performed, in parallel, with a byte as a unit, according to a tenth embodiment of the invention.

In FIG. 13, reference numeral 131 designates an initial value setting terminal, numeral 132 designates a clock input terminal, numeral 133 designates scrambled data input terminals, reference numeral 134 designates registers, numeral 135 designates coefficient multipliers, numeral 136 designates mod 2 adders, numeral 137 designates a logic circuit block, and numeral 138 designates descrambled data output terminals.

The descrambling operation according to this tenth embodiment is opposed to the scrambling operation according to the ninth embodiment, that is, data scrambled in the method according to the ninth embodiment are input by 8 bits in parallel, and descrambled data are output by 8 bits in parallel.

In the data descrambling method according to the tenth embodiment of the present invention, initial values are input to the serial shift registers and shifted, data output from the serial shift registers are subjected to mod 2 addition, i.e., multiplied by coefficients, and data so produced are fed back to the input of the serial shift registers. Meanwhile, the data output from the serial shift registers and data input in parallel are input to the logic circuit, and descrambled data are obtained in parallel. Therefore, parallelization is realized in a descrambling method different from the self-closing type descrambling method according to the aforementioned embodiments. In the conventional descrambling method in which data are serially processed, in order to realize parallel input or parallel output, input parallel data must be converted to serial data to be descrambled and, after the descrambling, the serial data must be converted to parallel data to be output. In the descrambling method according to this tenth embodiment, this trouble in the conventional method is dispensed with, and data input and data output can be performed by 8 bits in parallel. As a result, the circuit structure is simplified, and an I/O synchronized type circuit is realized.

While data are descrambled with a byte (8 bits) as a unit in this tenth embodiment of the invention, it is possible to descramble arbitrary bits, in a lump, using a similar descrambling method.

Embodiment 11

Figure 14:
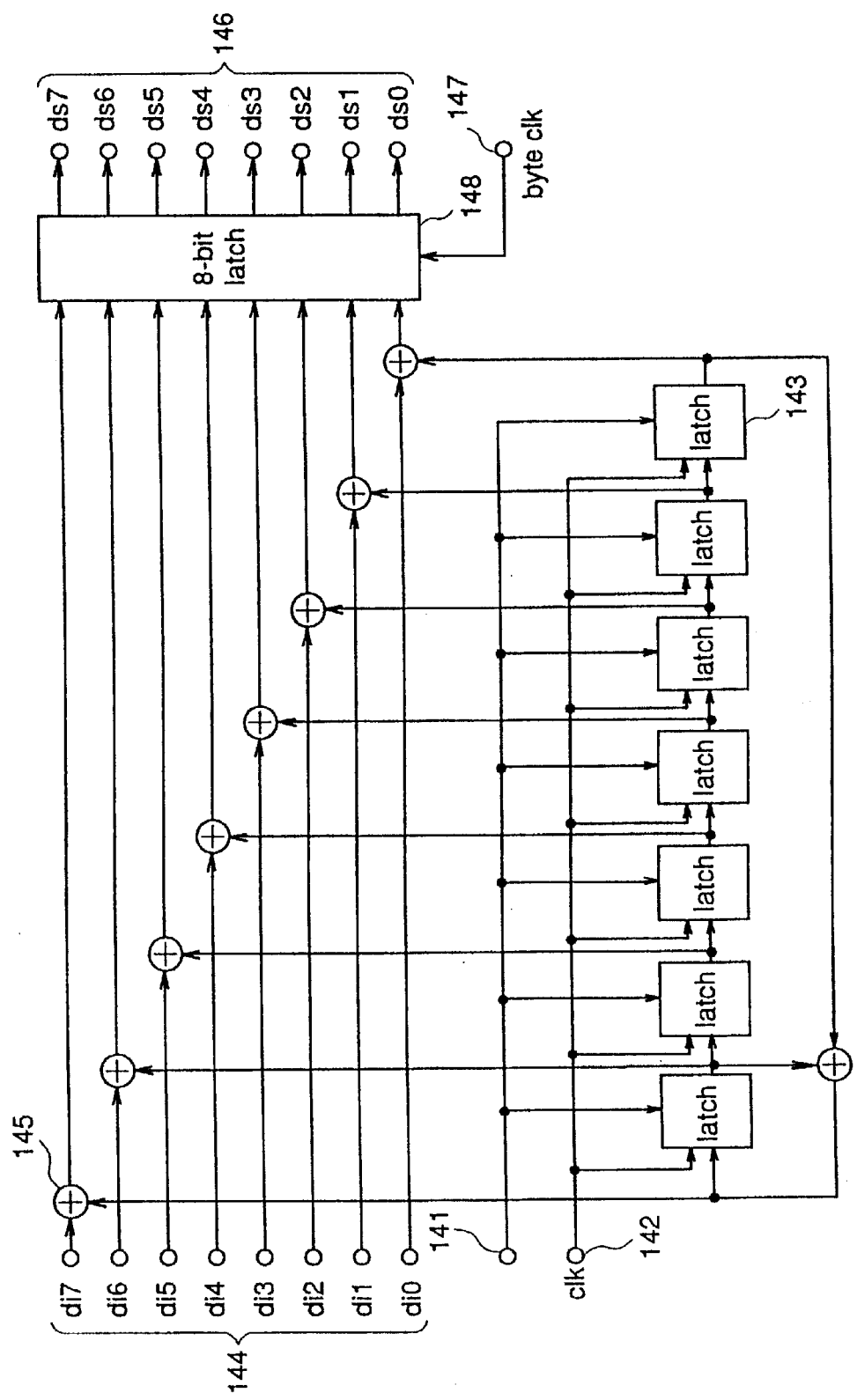
FIG. 14 is a diagram illustrating a structure of a data scrambling apparatus according to an eleventh embodiment of the present invention.

An eleventh embodiment of the present invention relates to a data scrambling apparatus that receives information data to be scrambled, by 8 bits in parallel, and outputs scrambled data by 8 bits in parallel. FIG. 14 shows an example of the scrambling apparatus. In order to facilitate and embody the explanation, a generating polynomial, $G(X) = X^7 + X^6 + 1$, is employed.

In FIG. 14, reference numeral 141 designates an initial value setting terminal, numeral 142 designates a bit clock input terminal, numeral 143 designates serial shift registers, numeral 144 designates data input terminals, numeral 145 designates mod 2 adders, numeral 146 designates scrambled data output terminals, numeral 147 designates a byte clock input terminal, and numeral 148 designates an 8-bit latch.

First of all, initial values are input to the serial shift registers 143 from the initial value setting terminal 141. Next, information data to be scrambled are input, by 8 bits in parallel, to the data input terminals 144. At each 8-bit input of the information data, the serial shift registers 143 shift the input data by 8 times in response to bit clocks input to the bit clock input terminal 142. After the 8-times shifting, the respective bits of the input data are added to the outputs from the respective registers by the mod 2 adders 145 and stored in the 8-bit input latch 148. Thereafter, scrambled data are output in parallel within a prescribed time interval in response to byte clocks input to the byte clock input terminal 147.

As a result, a data scrambling apparatus that receives information data in byte format, i.e., by 8 bits in parallel, and output scrambled data in byte format, i.e., by 8 bits in parallel, is realized. From the above-described generating polynomial, the serial shift registers have 7 stages.

In the data scrambling apparatus according to the eleventh embodiment of the present invention, initial values are input to the serial shift registers and shifted, data output from the serial shift registers are subjected to mod 2 addition, i.e., multiplied by coefficients, and data so produced are fed back to the input of the serial shift registers. Meanwhile, the data output from the serial shift registers and data input in parallel are input to the logic circuit, and scrambled data are obtained in parallel. Therefore, parallelization is realized in a scrambling apparatus different from the self-closing type scrambling apparatus according to the aforementioned embodiments. In the conventional scrambling apparatus in which data are serially processed, in order to realize parallel input or parallel output, input parallel data must be converted to serial data to be scrambled and, after the scrambling, the serial data must be converted to parallel data to be output. In the scrambling apparatus according to this eleventh embodiment, this trouble in the conventional apparatus is dispensed with, and data input and data output can be performed by 8 bits in parallel. As a result, the circuit structure is simplified, and an I/O synchronized type circuit is realized.

While data are scrambled with a byte (8 bits) as a unit in this eleventh embodiment of the invention, it is possible to scramble arbitrary bits, in a lump, using a similar scrambling apparatus.

Embodiment 12

Figure 15:
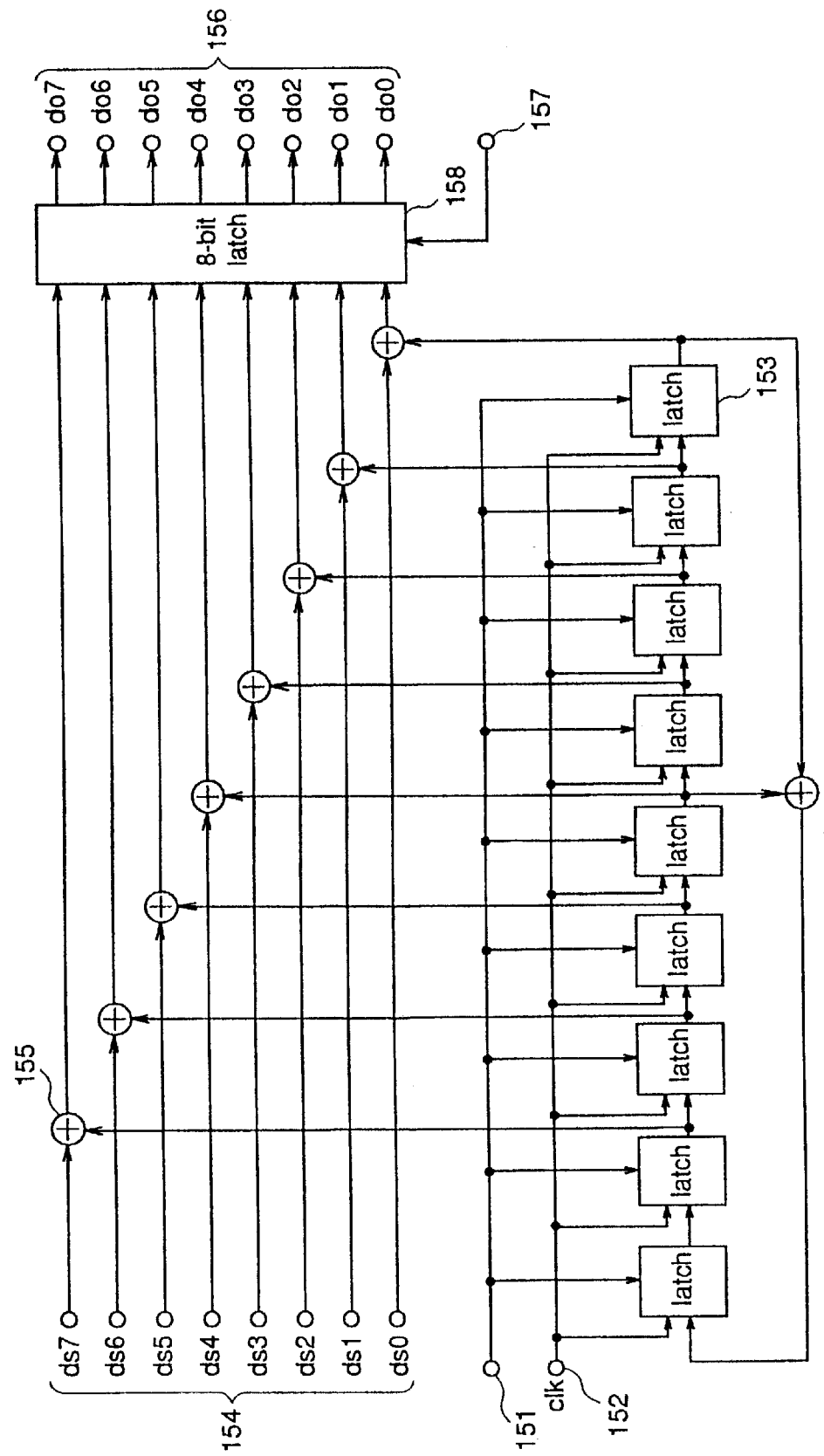
FIG. 15 is a diagram illustrating a structure of a data descrambling apparatus according to a twelfth embodiment of the present invention.
Figure 16:
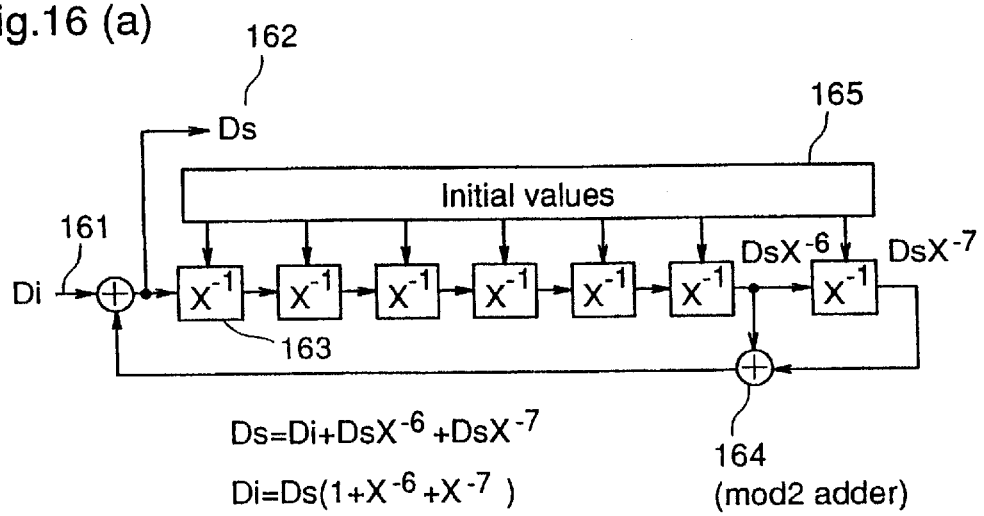
FIGS. 16(*a*) and 16(*b*) are diagrams illustrating a conventional data scrambling apparatus and a conventional data descrambling apparatus, respectively.
Figure 16:
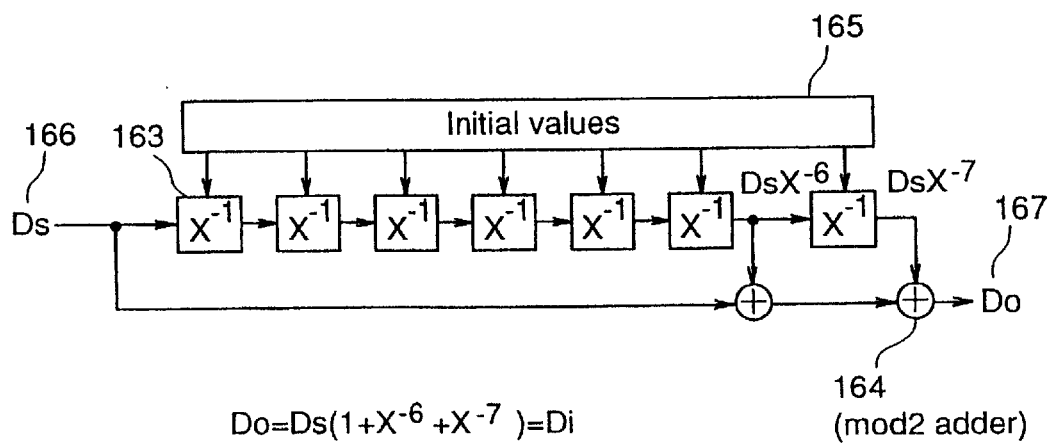
Figure 17:
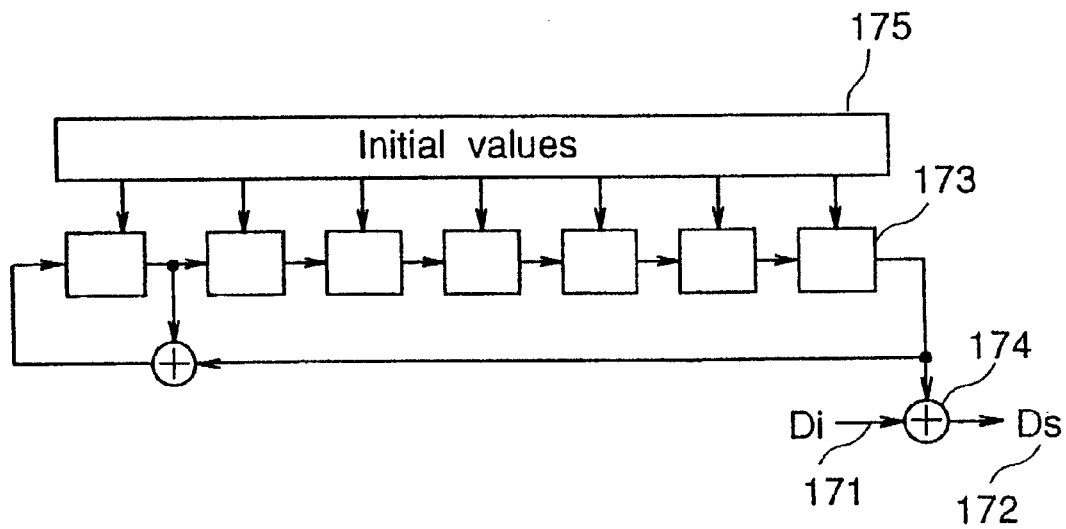
FIGS. 17(*a*) and 17(*b*) are diagrams illustrating a conventional data scrambling apparatus and a conventional data descrambling apparatus, respectively.
Figure 17:
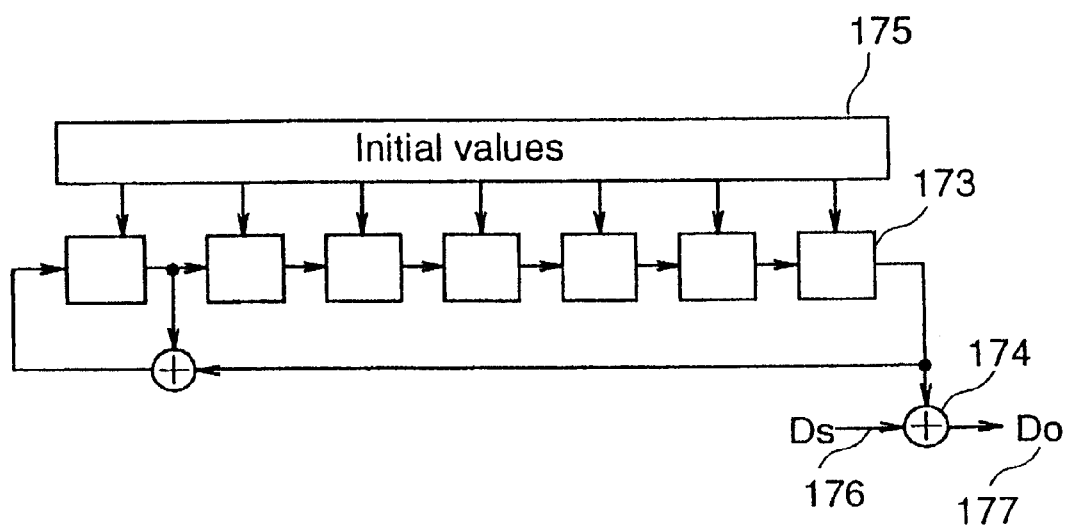

A twelfth embodiment of the present invention relates to a data descrambling apparatus that receives data, which are scrambled in binary format, by 8 bits in parallel, descrambles the input data, and outputs the descrambled data by 8 bits in parallel. FIG. 15 shows an example of the descrambling apparatus. In this descrambling apparatus, a generating polynomial, $G(X)=X^9+X^4+1$, is employed.

In FIG. 15, reference numeral 15 designates an initial value setting terminal, numeral 152 designates a bit clock input terminal, numeral 153 designates serial shift registers, numeral 154 designates scrambled data input terminals, numeral 155 designates mod 2 adders, numeral 156 designates data output terminals, numeral 157 designates a byte clock input terminal, and numeral 158 designates an 8-bit latch.

The operation of this descrambling apparatus is opposed to the operation of the scrambling apparatus according to the eleventh embodiment, that is, data scrambled by the apparatus according to the eleventh embodiment are input by 8 bits in parallel, and descrambled data are output by 8 bits in parallel. From the above-mentioned generating polynomial, the serial shift registers 153 have 9 stages.

In the data descrambling apparatus according to the twelfth embodiment of the present invention, initial values are input to the serial shift registers and shifted, data output from the serial shift registers are subjected to mod 2 addition, i.e., multiplied by coefficients, and data so produced are fed back to the input of the serial shift registers. Meanwhile, the data output from the serial shift registers and data input in parallel are input to the logic circuit, and descrambled data are obtained in parallel. Therefore, parallelization is realized in a descrambling apparatus different from the self-closing type descrambling apparatus according to the aforementioned embodiments. In the conventional descrambling apparatus in which data are serially processed, in order to realize parallel input or parallel output, input parallel data must be converted to serial data to be descrambled and, after the descrambling, the serial data must be converted to parallel data to be output. In the descrambling apparatus according to this twelfth embodiment, this trouble in the conventional apparatus is dispensed with, and data input and data output can be performed by 8 bits in parallel. As a result, the circuit structure is simplified, and an I/O synchronized type circuit is realized. Further, a descrambling apparatus is realized with a circuit structure similar to the scrambling apparatus according to the eleventh embodiment.

While data are descrambled with a byte (8 bits) as a unit in this twelfth embodiment of the invention, it is possible to descramble arbitrary bits, in a lump, using a similar descrambling apparatus.

TABLE 1

| i | 0 | 1 | 2 | 3 | 4 | 5 | 6 | 7 | 8 |
|---|---|---|---|---|---|---|---|---|---|
| R-m(i) | N-m | R-m+1(0) | R-m+1(1) | R-m+1(2) | R-m+1(3) | R-m+1(4) | R-m+1(5) | R-m+1(6) | R-m+1(7) |
| R-m+1(i) | N-m+1 | R-m+2(0) | R-m+2(1) | R-m+2(2) | R-m+2(3) | R-m+2(4) | R-m+2(5) | R-m+2(6) | R-m+2(7) |
| R-m+2(i) | N-m+2 | R-m+3(0) | R-m+3(1) | R-m+3(2) | R-m+3(3) | R-m+3(4) | R-m+3(5) | R-m+3(6) | R-m+3(7) |
| R-3(i) | N-3 | R-2(0) | R-2(1) | R-2(2) | R-2(3) | R-2(4) | R-2(5) | R-2(6) | R-2(7) |
| R-2(i) | N-2 | R-1(0) | R-1(1) | R-1(2) | R-1(3) | R-1(4) | R-1(5) | R-1(6) | R-1(7) |
| R-1(i) | N-1 | g-1R-1(0) +g-2R-2(0) +g-3R-3(0) +... +g-m+2 R-m+2(0) +g-m+1 R-m+1(0) +g-mR-m(0) +dn | g-1R-1(1) +g-2R-2(1) +g-3R-3(1) +... +g-m+2 R-m+2(1) +g-m+1 R-m+1(1) +g-mR-m(1) +dn-1 | g-1R-1(2) +g-2R-2(2) +g-3R-3(2) +... +g-m+2 R-m+2(2) +g-m+1 R-m+1(2) +g-mR-m(2) +dn-2 | g-1R-1(3) +g-2R-2(3) +g-3R-3(3) +... +g-m+2 R-m+2(3) +g-m+1 R-m+1(3) +g-mR-m(3) +dn-3 | g-1R-1(4) +g-2R-2(4) +g-3R-3(4) +... +g-m+2 R-m+2(4) +g-m+1 R-m+1(4) +g-mR-m(4) +dn-4 | g-1R-1(5) +g-2R-2(5) +g-3R-3(5) +... +g-m+2 R-m+2(5) +g-m+1 R-m+1(5) +g-mR-m(5) +dn-5 | g-1R-1(6) +g-2R-2(6) +g-3R-3(6) +... +g-m+2 R-m+2(6) +g-m+1 R-m+1(6) +g-mR-m(6) +dn-6 | g-1R-1(7) +g-2R-2(7) +g-3R-3(7) +... +g-m+2 R-m+2(7) +g-m+1 R-m+1(7) +g-mR-m(7) +dn-7 |
| ds (i) | | g-1R-1(0) +g-2R-2(0) +g-3R-3(0) +... +g-m+2 R-m+2(0) +g-m+1 R-m+1(0) +g-mR-m(0) +dn | g-1R-1(1) +g-2R-2(1) +g-3R-3(1) +... +g-m+2 R-m+2(1) +g-m+1 R-m+1(1) +g-mR-m(1) +dn-1 | g-1R-1(2) +g-2R-2(2) +g-3R-3(2) +... +g-m+2 R-m+2(2) +g-m+1 R-m+1(2) +g-mR-m(2) +dn-2 | g-1R-1(3) +g-2R-2(3) +g-3R-3(3) +... +g-m+2 R-m+2(3) +g-m+1 R-m+1(3) +g-mR-m(3) +dn-3 | g-1R-1(4) +g-2R-2(4) +g-3R-3(4) +... +g-m+2 R-m+2(4) +g-m+1 R-m+1(4) +g-mR-m(4) +dn-4 | g-1R-1(5) +g-2R-2(5) +g-3R-3(5) +... +g-m+2 R-m+2(5) +g-m+1 R-m+1(5) +g-mR-m(5) +dn-5 | g-1R-1(6) +g-2R-2(6) +g-3R-3(6) +... +g-m+2 R-m+2(6) +g-m+1 R-m+1(6) +g-mR-m(6) +dn-6 | g-1R-1(7) +g-2R-2(7) +g-3R-3(7) +... +g-m+2 R-m+2(7) +g-m+1 R-m+1(7) +g-mR-m(7) +dn-7 |

TABLE 2

| i | 0 | 1 | 2 | 3 | 4 | 5 | 6 | 7 | 8 |
|---|---|---|---|---|---|---|---|---|---|
| R-7(i) | N-7 | R-6(0) | R-6(1) | R-6(2) | R-6(3) | R-6(4) | R-6(5) | R-6(6) | R-6(7) |
| R-6(i) | N-6 | R-5(0) | R-5(1) | R-5(2) | R-5(3) | R-5(4) | R-5(5) | R-5(6) | R-5(7) |
| R-5(i) | N-5 | R-4(0) | R-4(1) | R-4(2) | R-4(3) | R-4(4) | R-4(5) | R-4(6) | R-4(7) |
| R-4(i) | N-4 | R-3(0) | R-3(1) | R-3(2) | R-3(3) | R-3(4) | R-3(5) | R-3(6) | R-3(7) |
| R-3(i) | N-3 | R-2(0) | R-2(1) | R-2(2) | R-2(3) | R-2(4) | R-2(5) | R-2(6) | R-2(7) |
| R-2(i) | N-2 | R-1(0) | R-1(1) | R-1(2) | R-1(3) | R-1(4) | R-1(5) | R-1(6) | R-1(7) |
| R-1(i) | N-1 | R-7(0)+R-6(0)+d7 | R-7(1)+R-6(1)+d6 | R-7(2)+R-6(2)+d5 | R-7(3)+R-6(3)+d4 | R-7(4)+R-6(4)+d3 | R-7(5)+R-6(5)+d2 | R-7(6)+R-6(6)+d1 | R-7(7)+R-6(7)+d0 |
| ds (i) |  | R-7(0)+R-6(0)+d7 | R-7(1)+R-6(1)+d6 | R-7(2)+R-6(2)+d5 | R-7(3)+R-6(3)+d4 | R-7(4)+R-6(4)+d3 | R-7(5)+R-6(5)+d2 | R-7(6)+R-6(6)+d1 | R-7(7)+R-6(7)+d0 |

TABLE 3

| i | 0 | 1 | 2 | 3 | 4 | 5 | 6 | 7 | 8 |
|---|---|---|---|---|---|---|---|---|---|
| R-m(i) | N-m | R-m+1(0) | R-m+1(1) | R-m+1(2) | R-m+1(3) | R-m+1(4) | R-m+1(5) | R-m+1(6) | R-m+1(7) |
| R-m+1(i) | N-m+1 | R-m+2(0) | R-m+2(1) | R-m+2(2) | R-m+2(3) | R-m+2(4) | R-m+2(5) | R-m+2(6) | R-m+2(7) |
| R-m+2(i) | N-m+2 | R-m+3(0) | R-m+3(1) | R-m+3(2) | R-m+3(3) | R-m+3(4) | R-m+3(5) | R-m+3(6) | R-m+3(7) |
| R-3(i) | N-3 | R-2(0) | R-2(1) | R-2(2) | R-2(3) | R-2(4) | R-2(5) | R-2(6) | R-2(7) |
| R-2(i) | N-2 | R-1(0) | R-1(1) | R-1(2) | R-1(3) | R-1(4) | R-1(5) | R-1(6) | R-1(7) |
| R-1(i) | N-1 | dn | dn-1 | dn-2 | dn-3 | dn-4 | dn-5 | dn-6 | dn-7 |
| do (i) |  | g-1R-1(0)+g-2R-2(0)+g-3R-3(0)+...+g-m+2R-m+2(0)+g-m+1R-m+1(0)+g-mR-m(0)+dn | g-1R-1(1)+g-2R-2(1)+g-3R-3(1)+...+g-m+2R-m+2(1)+g-m+1R-m+1(1)+g-mR-m(1)+dn-1 | g-1R-1(2)+g-2R-2(2)+g-3R-3(2)+...+g-m+2R-m+2(2)+g-m+1R-m+1(2)+g-mR-m(2)+dn-2 | g-1R-1(3)+g-2R-2(3)+g-3R-3(3)+...+g-m+2R-m+2(3)+g-m+1R-m+1(3)+g-mR-m(3)+dn-3 | g-1R-1(4)+g-2R-2(4)+g-3R-3(4)+...+g-m+2R-m+2(4)+g-m+1R-m+1(4)+g-mR-m(4)+dn-4 | g-1R-1(5)+g-2R-2(5)+g-3R-3(5)+...+g-m+2R-m+2(5)+g-m+1R-m+1(5)+g-mR-m(5)+dn-5 | g-1R-1(6)+g-2R-2(6)+g-3R-3(6)+...+g-m+2R-m+2(6)+g-m+1R-m+1(6)+g-mR-m(6)+dn-6 | g-1R-1(7)+g-2R-2(7)+g-3R-3(7)+...+g-m+2R-m+2(7)+g-m+1R-m+1(7)+g-mR-m(7)+dn-7 |

TABLE 4

| i | 0 | 1 | 2 | 3 | 4 | 5 | 6 | 7 | 8 |
|---|---|---|---|---|---|---|---|---|---|
| R-7(i) | N-7 | R-6(0) | R-6(1) | R-6(2) | R-6(3) | R-6(4) | R-6(5) | R-6(6) | R-6(7) |
| R-6(i) | N-6 | R-5(0) | R-5(1) | R-5(2) | R-5(3) | R-5(4) | R-5(5) | R-5(6) | R-5(7) |
| R-5(i) | N-5 | R-4(0) | R-4(1) | R-4(2) | R-4(3) | R-4(4) | R-4(5) | R-4(6) | R-4(7) |
| R-4(i) | N-4 | R-3(0) | R-3(1) | R-3(2) | R-3(3) | R-3(4) | R-3(5) | R-3(6) | R-3(7) |
| R-3(i) | N-3 | R-2(0) | R-2(1) | R-2(2) | R-2(3) | R-2(4) | R-2(5) | R-2(6) | R-2(7) |
| R-2(i) | N-2 | R-1(0) | R-1(1) | R-1(2) | R-1(3) | R-1(4) | R-1(5) | R-1(6) | R-1(7) |
| R-1(i) | N-1 | d7 | d6 | d5 | d4 | d3 | d2 | d1 | d0 |
| do (i) |  | R-7(0)+R-6(0)+d7 | R-7(1)+R-6(1)+d6 | R-7(2)+R-6(2)+d5 | R-7(3)+R-6(3)+d4 | R-7(4)+R-6(4)+d3 | R-7(5)+R-6(5)+d2 | R-7(6)+R-6(6)+d1 | R-7(7)+R-6(7)+d0 |

TABLE 5

| i | 0 | 1 | 2 | 3 | 4 | 5 | 6 | 7 | 8 |
|---|---|---|---|---|---|---|---|---|---|
| R0(i) | N0 | R1(0) | R1(1) | R1(2) | R1(3) | R1(4) | R1(5) | R1(6) | R1(7) |
| R1(i) | N1 | R2(0) | R2(1) | R2(2) | R2(3) | R2(4) | R2(5) | R2(6) | R2(7) |
| R2(i) | N2 | R3(0) | R3(1) | R3(2) | R3(3) | R3(4) | R3(5) | R3(6) | R3(7) |
| Rm-3(i) | Nm-3 | Rm-2(0) | Rm-2(1) | Rm-2(2) | Rm-2(3) | Rm-2(4) | Rm-2(5) | Rm-2(6) | Rm-2(7) |
| Rm-2(i) | Nm-2 | Rm-1(0) | Rm-1(1) | Rm-1(2) | Rm-1(3) | Rm-1(4) | Rm-1(5) | Rm-1(6) | Rm-1(7) |
| Rm-1(i) | Nm-1 | gm-1Rm-1(0)+gm-2Rm-2(0) | gm-1Rm-1(1)+gm-2Rm-2(1) | gm-1Rm-1(2)+gm-2Rm-2(2) | gm-1Rm-1(3)+gm-2Rm-2(3) | gm-1Rm-1(4)+gm-2Rm-2(4) | gm-1Rm-1(5)+gm-2Rm-2(5) | gm-1Rm-1(6)+gm-2Rm-2(6) | gm-1Rm-1(7)+gm-2Rm-2(7) |

TABLE 5-continued

| i | 0 | 1 | 2 | 3 | 4 | 5 | 6 | 7 | 8 |
|---|---|---|---|---|---|---|---|---|---|
| | | +gm-3 | +gm-3 | +gm-3 | +gm-3 | +gm-3 | +gm-3 | +gm-3 | +gm-3 |
| | | Rm-3(0) | Rm-3(1) | Rm-3(2) | Rm-3(3) | Rm-3(4) | Rm-3(5) | Rm-3(6) | Rm-3(7) |
| | | +... | +... | +... | +... | +... | +... | +... | +... |
| | | +g2 R2(0) | +g2 R2(1) | +g2 R2(2) | +g2 R2(3) | +g2 R2(4) | +g2 R2(5) | +g2 R2(6) | +g2 R2(7) |
| | | +g1 R1(0) | +g1 R1(1) | +g1 R1(2) | +g1 R1(3) | +g1 R1(4) | +g1 R1(5) | +g1 R1(6) | +g1 R1(7) |
| | | +g0 R0(0) | +g0 R0(1) | +g0 R0(2) | +g0 R0(3) | +g0 R0(4) | +g0 R0(5) | +g0 R0(6) | +g0 R0(7) |
| ds (i) | | Ro(0)+dn | Ro(1)+dn-1 | Ro(2)+dn-2 | Ro(3)+dn-3 | Ro(4)+dn-4 | Ro(5)+dn-5 | Ro(6)+dn-6 | Ro(7)+dn-7 |

What is claimed is:

1. A data descrambling apparatus performing a data descrambling method defined by data polynomial, $$D(X) = d_0 X^0 + d_1 X^1 + d_2 X^2 + \ldots + d_{n-2} X^{n-2} + d_n X^n + d_n X^n$$

generating polynomial, $$G(X) = 1 + g_{-1} X^{-1} + g_{-2} X^{-2} + \ldots + g_{-m+2} X^{-m+2} + g_{-m+1} X^{-m+1} + g_{-m} X^{-m}$$

and, residual polynomial, $$R(X) = R_{-1} X^{-1} + R_{-2} X^{-2} + R_{-3} X^{-3} + \ldots + R_{-m+2} X^{-m+2} + R_{-m+1} X^{-m+1} + R_{-m} X^{-m}$$

wherein n is integer multiple of 8, and n>m,
said apparatus characterized by:
initial value setting means for setting initial values $R_{-m+k}(0) = N_{-m+k}$ of the respective coefficients $R_{-m+k}$ (k=0, 1, ..., m-1) in the residual polynomial (here, $R_{-m+k(i)}$ is a value obtained, when the coefficient $R_{-m+k}$ in the residual polynomial is a value of a latch, by shifting the latch by i times) to 0 or 1;
in order to treat information data with a byte as a unit, an exclusive OR circuit block comprising 8-bit parallel latches in $\{In|(m+7)/8|+1\}$ stages (In|formula| is a value of an integral part of a value obtained by the formula), said exclusive OR circuit block performing an exclusive OR operation such that values of the 8-bit latches and outputs from output terminals have a relationship, $$doi = Ri + \sum_{k=1}^{m} \{g_{-k} R_{-(k-i)}\} \quad (i = 0, 1, \ldots, 7)$$

and outputting do0~do7;
8-bit parallel to serial converting means for converting parallel data descrambled by the exclusive OR circuit block to serial data; and
an output terminal for outputting binary data converted to serial bits by the parallel to serial converting means;
whereby data scrambled in binary format are input in byte format, by 8 bits in parallel, descrambled in byte format, by 8 bits in parallel, and output serially in binary format.

* * * * *